(12) United States Patent
Hromin

(10) Patent No.: US 11,287,324 B2
(45) Date of Patent: Mar. 29, 2022

(54) SYSTEM AND METHOD FOR CALIBRATING A LIGHT COLOR SENSOR

(71) Applicant: Crestron Electronics, Inc., Rockleigh, NJ (US)

(72) Inventor: Dennis Hromin, Park Ridge, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 17/150,759

(22) Filed: Jan. 15, 2021

(65) Prior Publication Data

US 2021/0140828 A1  May 13, 2021

Related U.S. Application Data

(63) Continuation of application No. 16/704,515, filed on Dec. 5, 2019, now Pat. No. 11,002,605, which is a continuation-in-part of application No. 16/402,956, filed on May 3, 2019, now Pat. No. 10,750,597.

(60) Provisional application No. 62/667,104, filed on May 4, 2018.

(51) Int. Cl.
*G01J 3/50* (2006.01)
*H04N 9/73* (2006.01)
*H04N 1/60* (2006.01)
*G01J 3/28* (2006.01)

(52) U.S. Cl.
CPC . *G01J 3/50* (2013.01); *G01J 3/28* (2013.01); *H04N 1/60* (2013.01); *H04N 9/735* (2013.01)

(58) Field of Classification Search
CPC ............... G01J 3/46; G01J 3/50; G01J 1/4204
See application file for complete search history.

(56) References Cited

FOREIGN PATENT DOCUMENTS

WO     WO-2006069117 A2 *  6/2006   ........... G03G 15/043

* cited by examiner

*Primary Examiner* — Maurice C Smith
(74) *Attorney, Agent, or Firm* — Crestron Electronics, Inc.

(57) ABSTRACT

An ambient light color sensing device adapted to determine color of ambient light and method for calibrating thereof. The ambient light color sensing device comprises a memory, a processor, and a light color sensor having a plurality of channels that detect light at different wavelengths to produce sensor readings. Wherein the processor receives sensor readings from the light color sensor, determines an interpolated spectral power distribution from the received sensor readings, converts the interpolated spectral power distribution to at least one measured light color value that quantifies color of light, and determines at least one calibrated light color value by correlating the at least one measured light color value through a calibration matrix.

24 Claims, 14 Drawing Sheets

SYSTEM AND METHOD FOR CALIBRATING A LIGHT COLOR SENSOR

BACKGROUND OF THE INVENTION

Technical Field

Aspects of the embodiments relate to a light color sensor adapted to detect the color, or more particularly the color temperature, of ambient light, including systems, methods, and modes for calibrating the light color sensor.

Background Art

The lighting industry is starting to better understand the value in manipulating the color, or more particularly the color temperature, of light. Color temperature is a description of the warmth or coolness of a light source typically expressed in Kelvins (K)—with a range of between about 2000K (warm colors) to above 5500K (cool colors). Manipulation of artificial light as the primary circadian stimulus in buildings is now a hot trend in architectural lighting. All plants and animals have a biological clock that tells them when to wake and when to sleep, when to be alert and when to rest. This internal clock does not exactly measure the length of an astronomical 24-hour day. Instead, to keep our circadian rhythm in sync or entrained with an earthly day, the human body is sensitive to environmental stimuli, the most influential being the sunlight.

Medical research has identified various circadian rhythm disruptions, typically related to sleep, such as Delayed Sleep Phase Disorder (night owls), Advanced Sleep Phase Disorder (morning larks), Jet Lag, Shift Work Disorder, Non-24 (blind people getting day and night mixed up), and Narcolepsy. These, along with other health and wellbeing concerns, have put circadian rhythm and the non-visual effects of light at the forefront of the architectural lighting design community. Lighting can stimulate our circadian system to invoke entrainment or acute alertness in the architectural spaces we build. Quantitative metrics, such as the Circadian Stimulus (CS), help lighting designers collaborate with medical research to leverage manipulation of artificial light as the primary circadian stimulus in healthier well buildings.

When designing a space for circadian effect there are various objectives typically considered for a lighting system, including incident angle (the direction from which light enters the eye), spectrum (the color of light), intensity (how bright or dark the light is), and dosage (the frequency and duration of light exposure). Studies have suggested that changes of color temperature plays a major role in regulating the internal circadian rhythm, without which the internal clock can become out of alignment. Light intensity also affects the circadian rhythm and must be taken into consideration. As such, color and light intensity should be combined to provide a space that is not only safe and efficient, but also satisfies the circadian objectives.

Considerable adjustments and tuning must be made to achieve or modify a circadian objective. Providing a solution that customers can easily understand and use is paramount. A typical implementation of a circadian solution includes a color changing luminaire, a controller or a control processor, and a user interface that is flexible and easy to use. To properly design for spectrum, or color, the lighting luminaire contains an array of a plurality of light emitting diodes (LED) and a properly paired LED driver. The LED array may be a tunable white array (i.e. 2200K-6000K) or a full red-green-blue-white (RGB(W)) chipset. The LED driver may be digitally addressable via digital control protocols, such as DMX or DALI®, to more accurately reproduce color and light intensity. The color of a fixture may be also controlled using a 0-10V, phase (dim to warm), or PWM (tape lights) signals. Typically, end users are provided with graphical user interfaces (GUIs), such as touch screens, mobile apps, or desktop apps, for manual adjustment of color temperature as well as light intensity. For example, color temperature can be adjusted using color pickers by typing in the RGB value or Kelvin sliders to select a color by touch. However, such interfaces may become confusing and prone to human error. While a desired color temperature can be selected, this color temperature may not be optimal in achieving a circadian objective.

On the other hand, automatically adjusting the color temperature and intensity of light to synchronize with the natural circadian rhythm can create an optimal environment. In office spaces, circadian lighting control can help drive greater concentration, productivity, and creativity among workers. In healthcare environments, such as in a patient's room, it can promote faster healing, which translates into better outcomes, faster patient out-time, and cost savings. In classrooms, it can lead to better student behavior and concentration. And in hotels it can help guests acclimate their natural body rhythms to local time and thereby mitigate the effects of jet lag during the day. In addition to the physical benefits, the new WELL Building Standard® provides building owners and managers cost-saving deployment guidelines for building features that impact health and wellbeing, including lighting.

Accordingly, a need has arisen for systems, methods, and modes for a light color sensor that can automatically control the color, or more particularly the color temperature, of a lighting system based on natural sunlight readings.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for a light color sensor that can automatically control color, or more particularly the color temperature, of a lighting system based on natural sunlight readings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments, an ambient light color sensor is provided adapted to determine color of ambient light. The sensor comprises a sensor body comprising at least one diffuser and a light color sensing module disposed below the at least one diffuser. The light color sensing module comprises a plurality of channels adapted to detect light collected by the at least one diffuser at different wavelengths to produce sensor readings. The sensor is adapted to: store a calibration matrix determined by calibrating a test light color sensor to a test ambient light source; receive the sensor readings from the light color sensing module; determine an interpolated spectral power distribution from the received sensor readings; convert the interpolated spectral power distribution to at least one measured light color value that quantifies color of light; and determine at least one calibrated light color value by correlating the at least one measured light color value through the calibration matrix.

According to an embodiment, the calibration matrix correlates test sensor readings of the test ambient light source determined by the test light color sensor with target sensor readings of the test ambient light source determined by a spectrometer. According to a further embodiment, the calibration matrix is developed by testing the test ambient light source under different ambient lighting conditions. The ambient lighting conditions may comprise different times of day, different times of year, on a sunny day with clear sky under direct sunlight, on a sunny day with clear sky but indirectly in the shade, during a cloudy day, and any combinations thereof. According to an embodiment, the test light color sensor comprises substantially the same components as the ambient light color sensor. According to another embodiment, the ambient light color sensor is the test light color sensor.

According to a further embodiment, the calibration matrix is determined by a test processor adapted to: receive test sensor readings of the ambient light source from the test light color sensor; determine a test interpolated spectral power distribution from the received test sensor readings; convert the test interpolated spectral power distribution to at least one test light color value that quantifies color of light; and determine the calibration matrix by correlating the at least one test light color value to at least one target light color value, wherein the at least one target light color value is determined from target sensor readings of the ambient light source by a spectrometer. According to an embodiment, the test light color sensor may comprise at least one processor adapted to store a test normalized gain value for each channel of the test light color sensor and normalize each received test sensor reading of the test light color sensor using the test normalized gain value of a respective channel, wherein each test normalized gain value is determined by calibrating the test light color sensor to an artificial light source. According to an embodiment, the at least one processor of the ambient light color sensor may be further adapted to store a normalized gain value for each channel and normalize each received sensor reading of the ambient light color sensor using the normalized gain value of a respective channel, wherein each normalized gain value is determined by calibrating the ambient light color sensor to the artificial light source.

According to an embodiment, the sensor readings received from the ambient light color sensor and test sensor readings received from the test light color sensor during calibration thereof may be normalized by calibrating the ambient light color sensor and the test light color sensor to an artificial light source. According to an embodiment, the at least one processor of the ambient light color sensor may be further adapted to store a normalized gain value for each channel and normalize each received sensor reading using the normalized gain value of a respective channel, wherein each normalized gain value is determined by calibrating the ambient light color sensor to an artificial light source. According to an embodiment, the normalized gain values are determined by a test processor adapted to: store a target representation of a spectral power distribution of the artificial light source; receive test sensor readings of the artificial light source from the ambient light color sensor; determine a test representation of spectral power distribution of the artificial light source using the test sensor readings; and determine the normalizing gaining values by comparing the test representation of spectral power distribution of the artificial light source to the target representation of the spectral distribution of the artificial light source. According to an embodiment, the target representation of the spectral power distribution of the artificial light source may be determined from sensor readings of the artificial light source by a spectrometer. According to an embodiment, the artificial light source may comprise a substantially linear spectral power distribution. The test representation of spectral power distribution of the artificial light source may comprise a test slope, and the target representation of the spectral distribution of the artificial light source may comprise a target slope.

According to an embodiment, the received sensor readings may comprise calibrated module sensor readings obtained by multiplying raw sensor readings from each channel of the ambient light color sensor module by a module gain value for the respective channel. The module gain value for each channel may be determined by calibrating the light color sensor module to an artificial light source outside of the sensor body.

According to an embodiment, the light color sensor module comprises a six-channel multi-spectral sensor. According to an embodiment, the at least one calibrated light color value may comprise a correlated color temperature value, x,y values, XYZ values, RGB values, HSV, and any combinations thereof. According to an embodiment, the interpolated spectral power distribution may be determined by using a natural cubic spline interpolation.

According to another aspects of the present embodiments, an ambient light color sensor is provided adapted to determine color of ambient light. The sensor comprises a sensor body comprising at least one diffuser, a light color sensing module disposed below the at least one diffuser, and at least one processor. The light color sensing module comprises a plurality of channels adapted to detect light collected by the at least one diffuser at different wavelengths to produce sensor readings. The at least one processor is adapted to: store a calibration matrix that correlates test sensor readings of a test ambient light source determined by a test light color sensor with target sensor readings of the test ambient light source determined by a spectrometer; receive sensor readings from the light color sensing module; determine an interpolated spectral power distribution from the sensor readings received from the light color sensing module; convert the interpolated spectral power distribution to at least one measured light color value that quantifies color of light; and determine at least one calibrated light color value by correlating the at least one measured light color value through the calibration matrix. The sensor readings received from the ambient light color sensor and the test sensor readings received from the test light color sensor during calibration thereof are normalized by calibrating the ambient light color sensor and the test light color sensor to an artificial light source.

According to yet another aspect of the embodiments, a method is provided of calibrating an ambient light color sensor to determine color of ambient light. The ambient light color sensor comprises a sensor body having at least one diffuser, and a light color sensing module disposed below the at least one diffuser. The light color sensing module comprises a plurality of channels adapted to detect light collected by the at least one diffuser at different wavelengths. The method comprises the steps of: determining a calibration matrix by calibrating a test light color sensor to a test ambient light source; storing the calibration matrix at the ambient light color sensor; receiving sensor readings from the light color sensing module; determining an interpolated spectral power distribution from the received sensor readings; converting the interpolated spectral power distribution to at least one measured light color value that quantifies color of light; and determining at least one calibrated light color value by correlating the at least one measured light color value through the calibration matrix.

According to an embodiment, the step of determining a calibration matrix comprises the steps of: receiving test sensor readings of the ambient light source from the test light color sensor; determining a test interpolated spectral power distribution from the received test sensor readings; converting the test interpolated spectral power distribution to at least one test light color value that quantifies color of light; determining at least one target light color value from target sensor readings of the ambient light source by a spectrometer; and determining the calibration matrix by correlating the at least one test light color value to the at least one target light color value. According to another embodiment the method may further comprise the step of: normalizing the sensor readings received from the ambient light color sensor and test sensor readings received from the test light color sensor during calibration thereof by calibrating the ambient light color sensor and the test light color sensor to an artificial light source. According to another embodiment, the method may further comprise the steps of: determining a normalized gain value for each channel of the ambient light color sensor by calibrating the ambient light color sensor to an artificial light source; and normalizing each received sensor reading of the ambient light color sensor using the normalized gain value of a respective channel. According to a further embodiment, the step of determining the normalized gain values may further comprise the steps of: storing a target representation of a spectral power distribution of the artificial light source; receiving test sensor readings of the artificial light source from the ambient light color sensor; determining a test representation of spectral power distribution of the artificial light source using the test sensor readings; and determining the normalizing gaining values by comparing the test representation of spectral power distribution of the artificial light source to the target representation of the spectral distribution of the artificial light source.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

Figure 1:
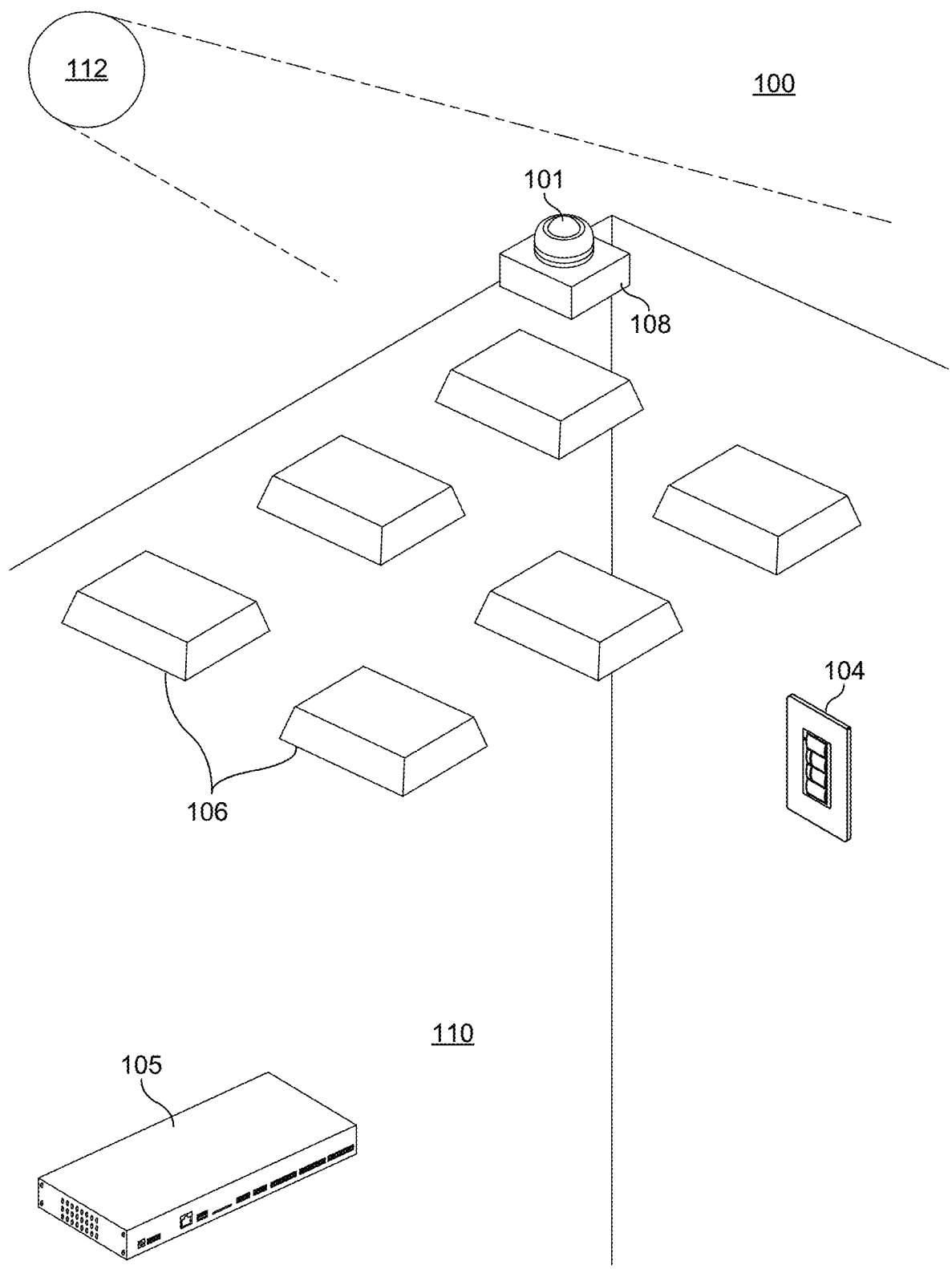

FIG. 1 illustrates a lighting control system comprising a light color sensor according to an embodiment.

Figure 2:
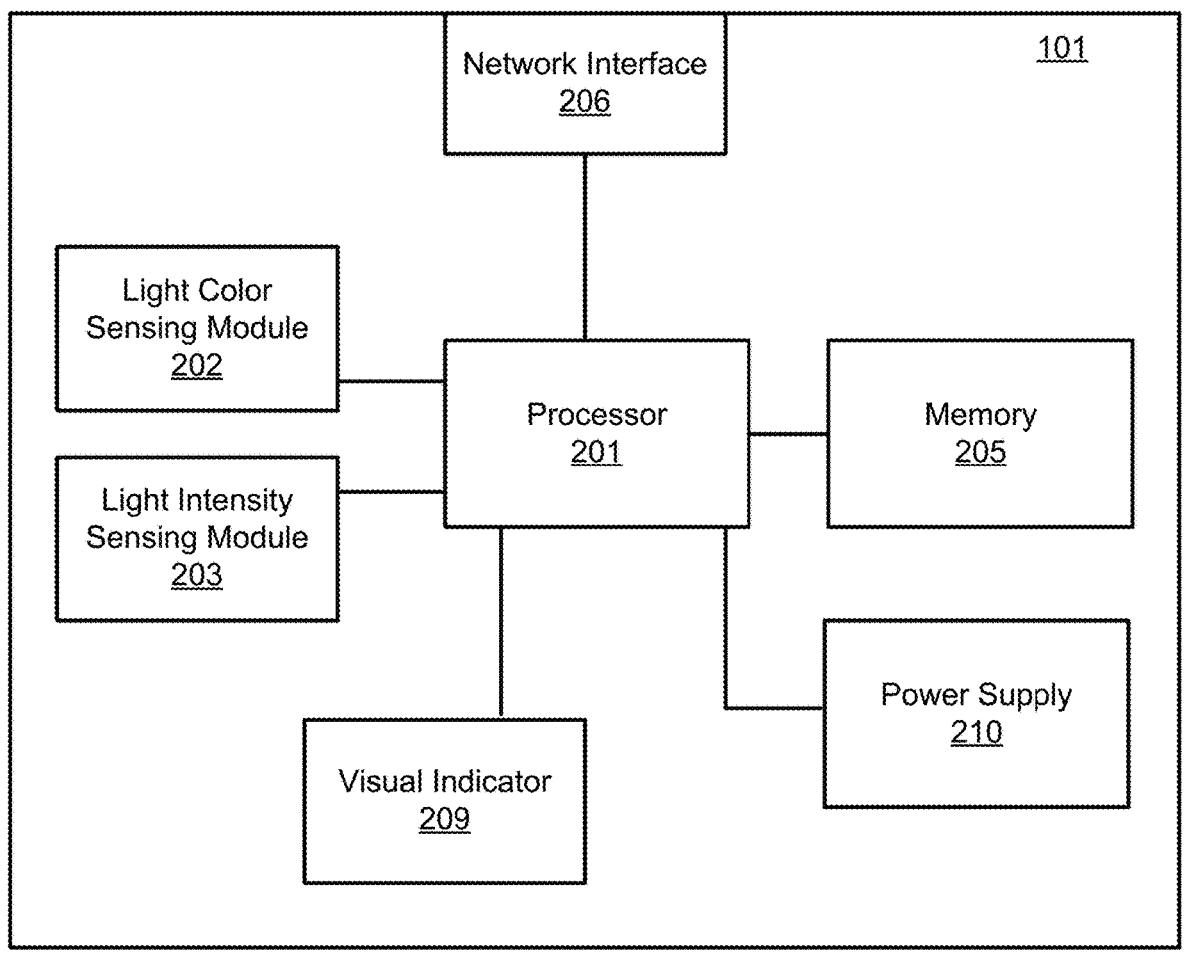

FIG. 2 illustrates a block diagram of the light color sensor according to an embodiment.

Figure 3:
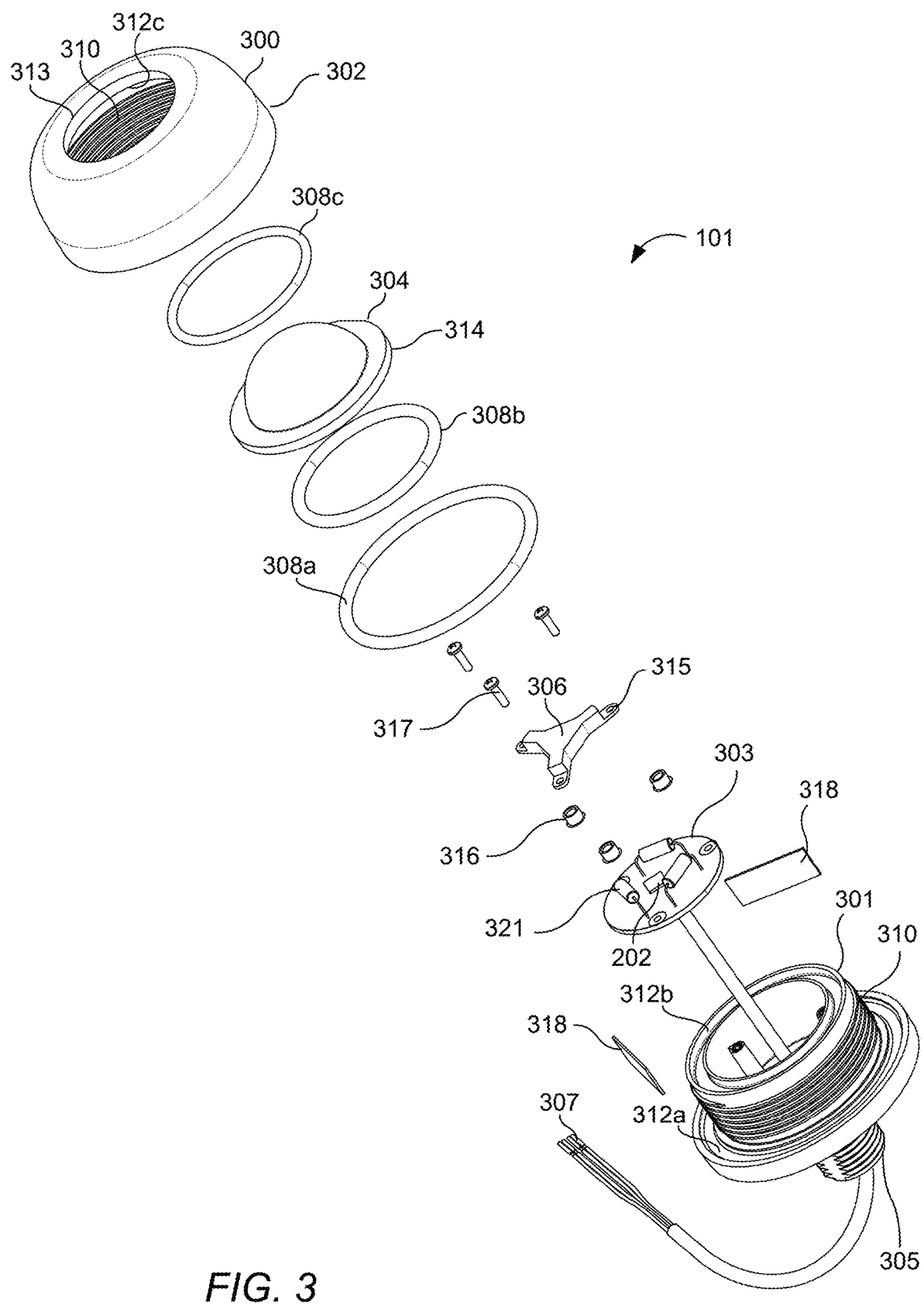

FIG. 3 illustrates an exploded view of the light color sensor according to an embodiment.

Figure 4:
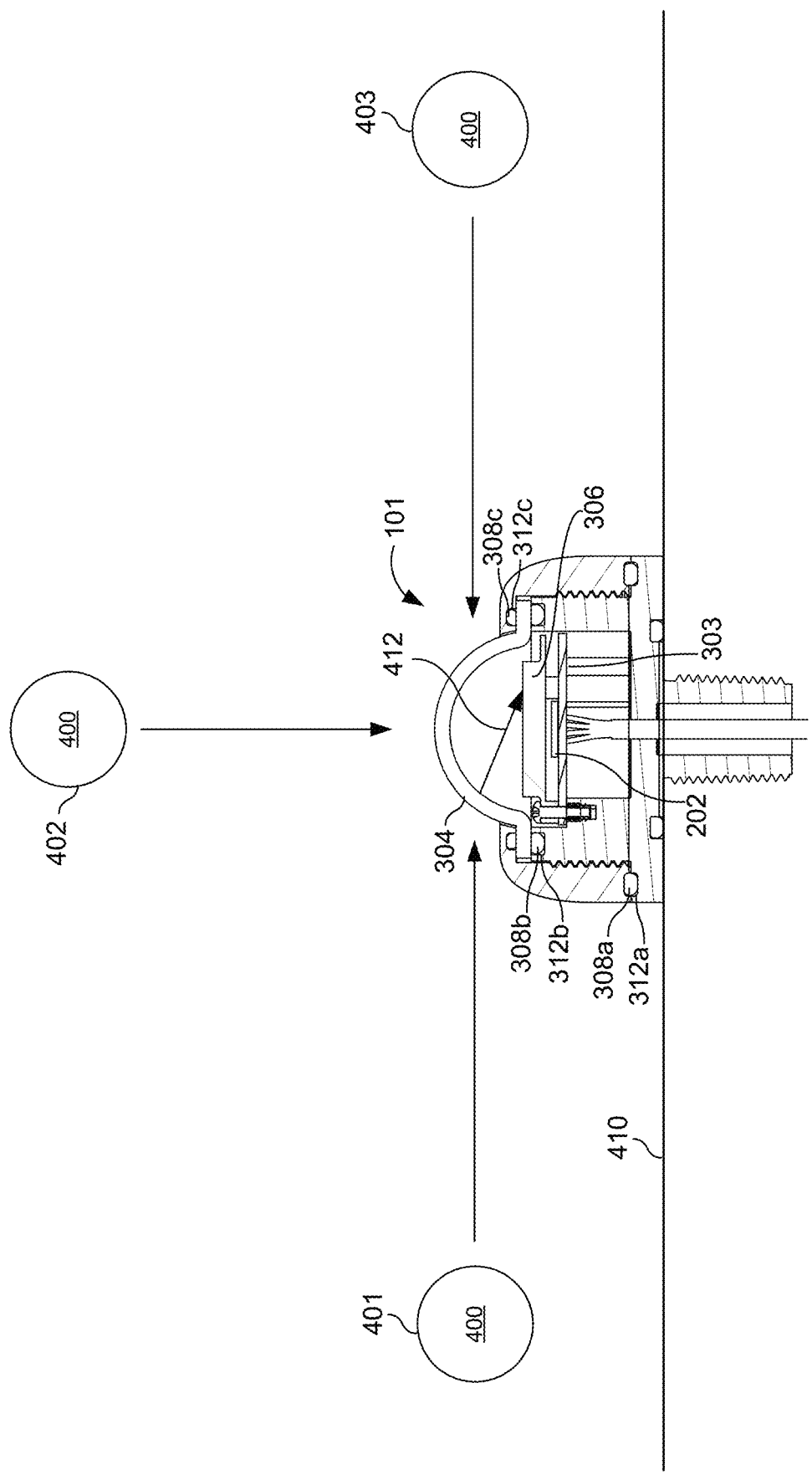

FIG. 4 illustrates a cross-sectional view of the light color sensor and its position with respect to sunlight according to an embodiment.

Figure 5:
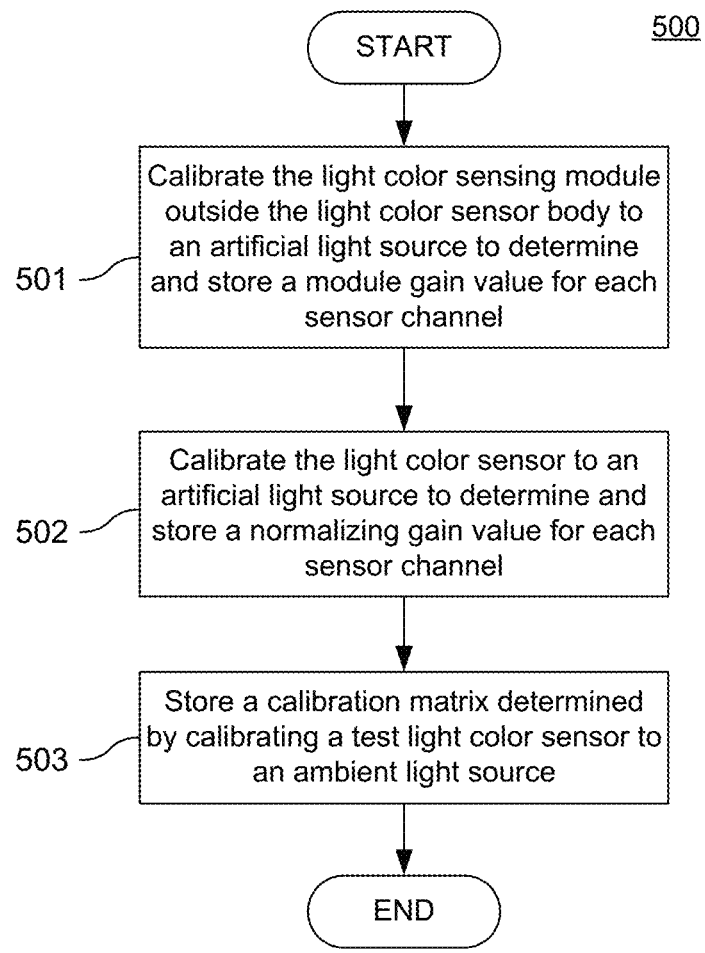

FIG. 5 shows a flowchart illustrating the steps for a method of calibrating the light color sensor according to an embodiment.

Figure 6:
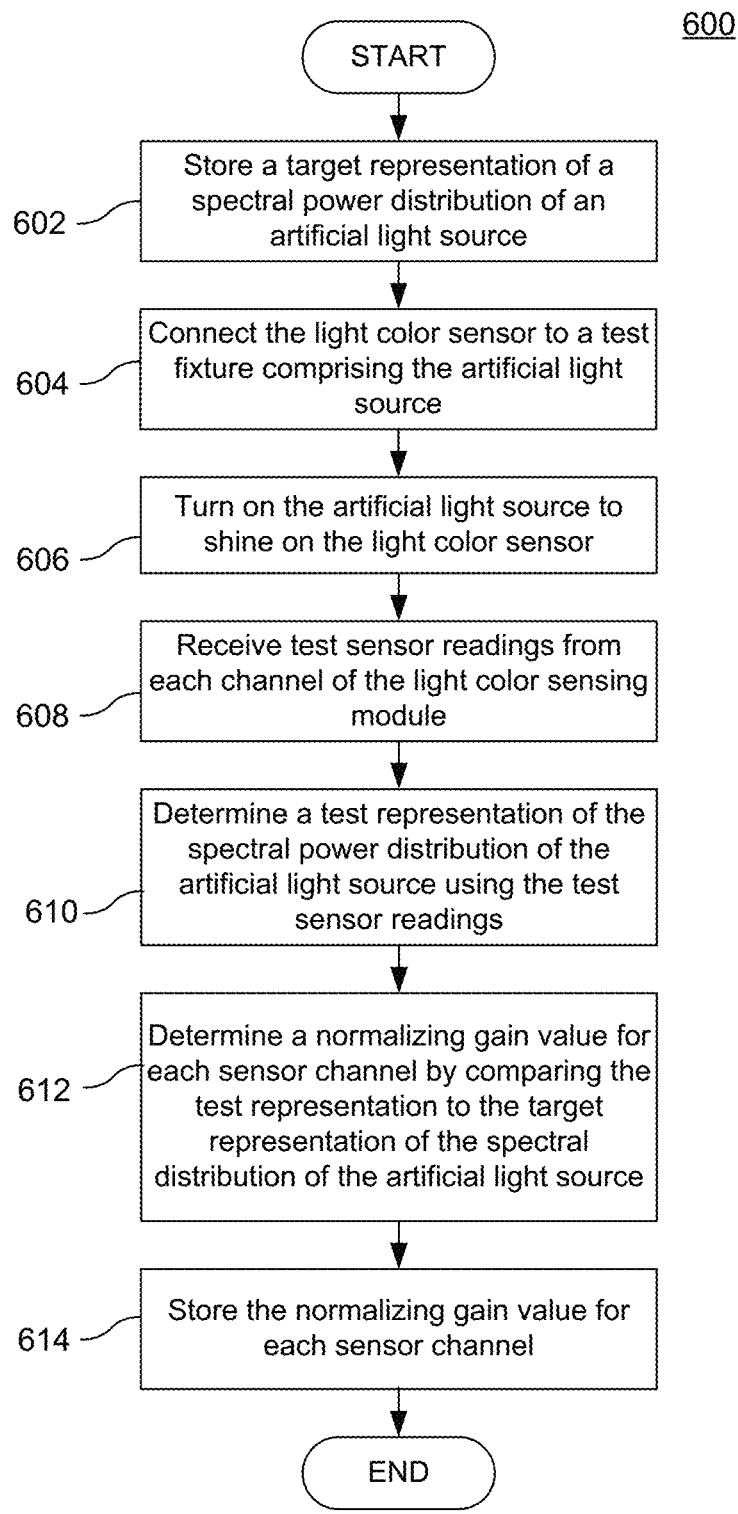

FIG. 6 shows a flowchart illustrating the steps for a method of calibrating the light color sensor to determine a normalizing gain value according to an embodiment.

Figure 7:
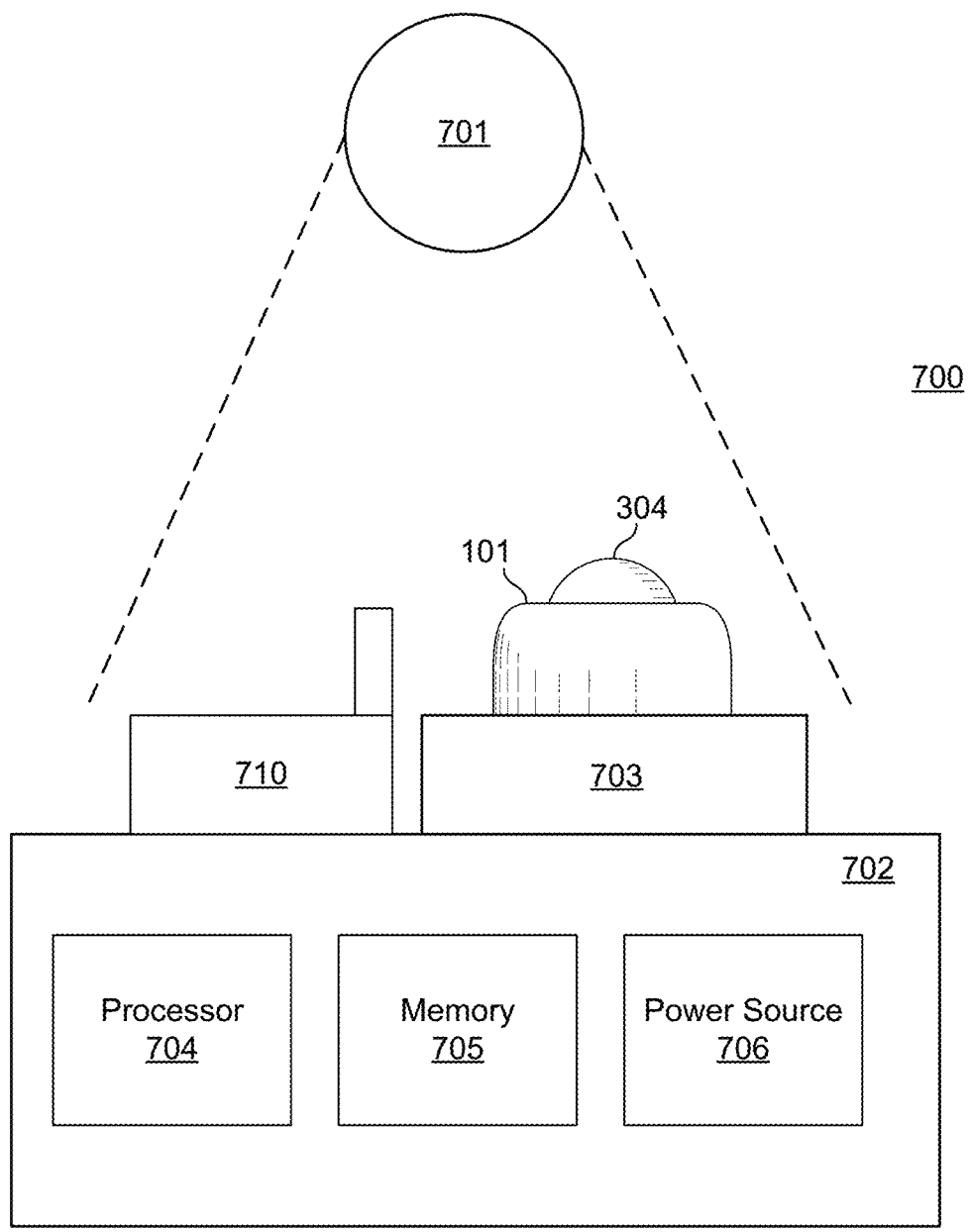

FIG. 7 illustrates a diagram of a test fixture for calibrating the light color sensor according to an embodiment.

Figure 8:
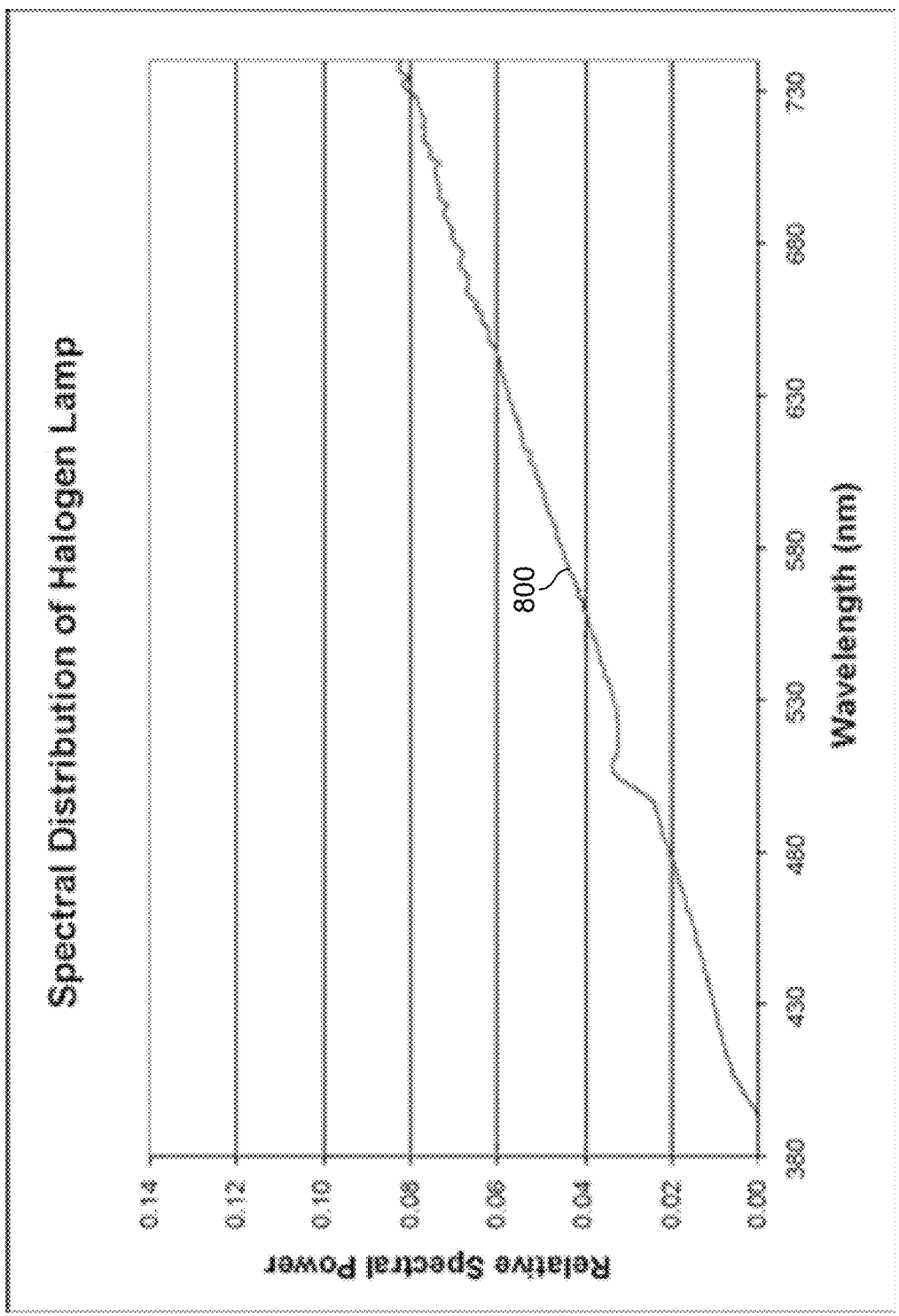

FIG. 8 illustrates an exemplary spectral power distribution of a halogen lamp.

Figure 9:
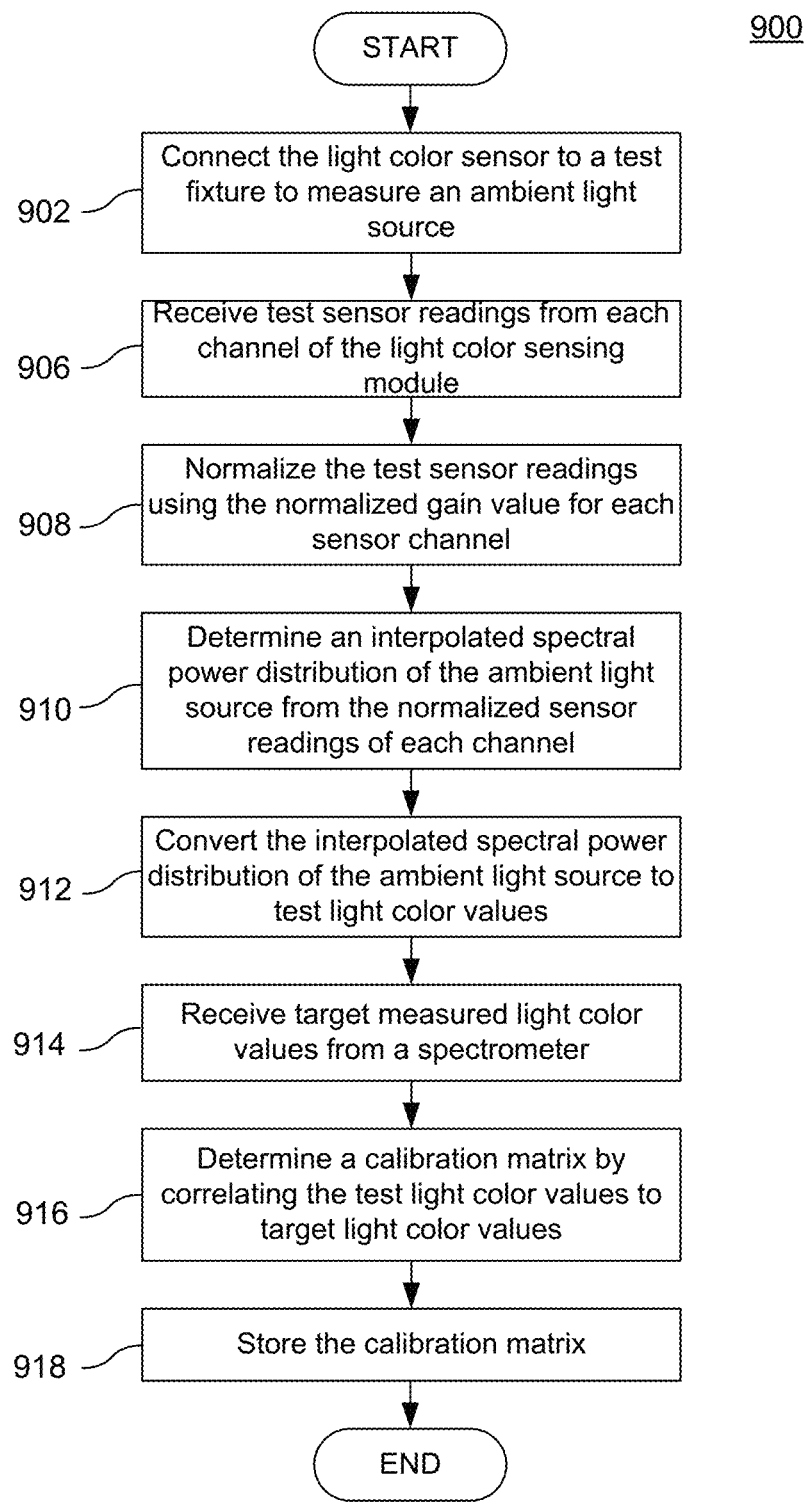

FIG. 9 shows a flowchart illustrating the steps for a method of calibrating the light color sensor to determine a calibration matrix according to an embodiment.

Figure 10:
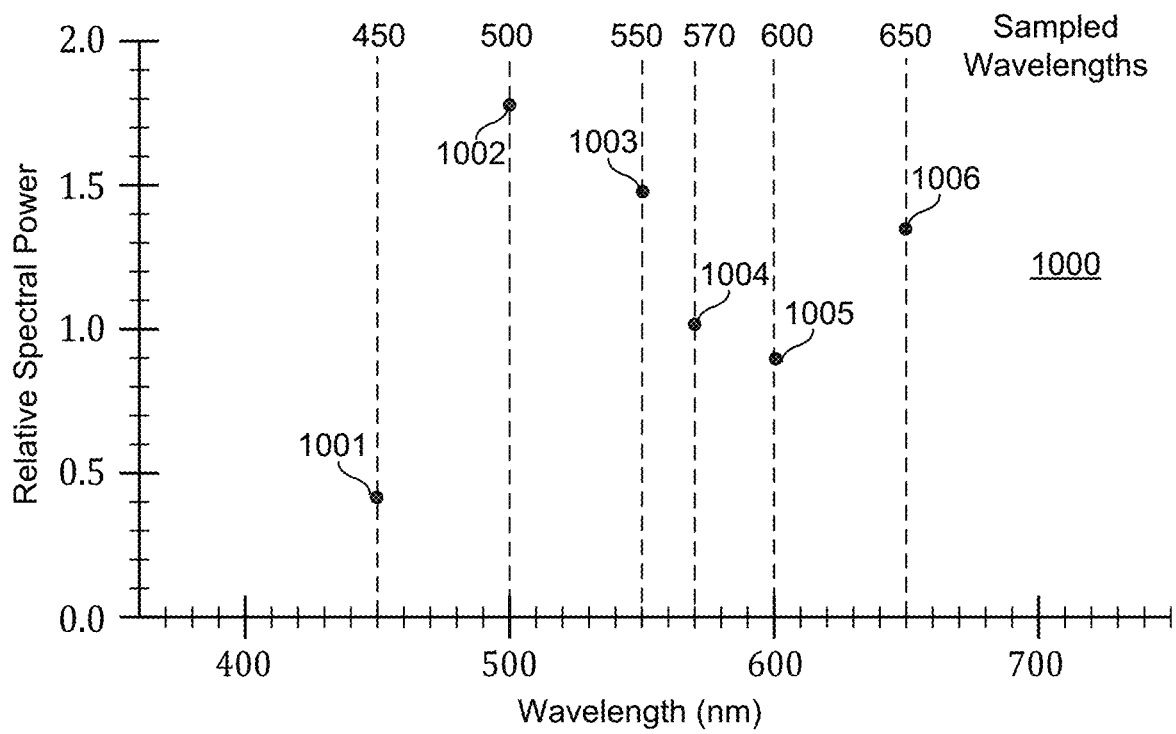

FIG. 10 illustrates an exemplary set of the six channel sensor readings on a spectral power distribution graph.

Figure 11:
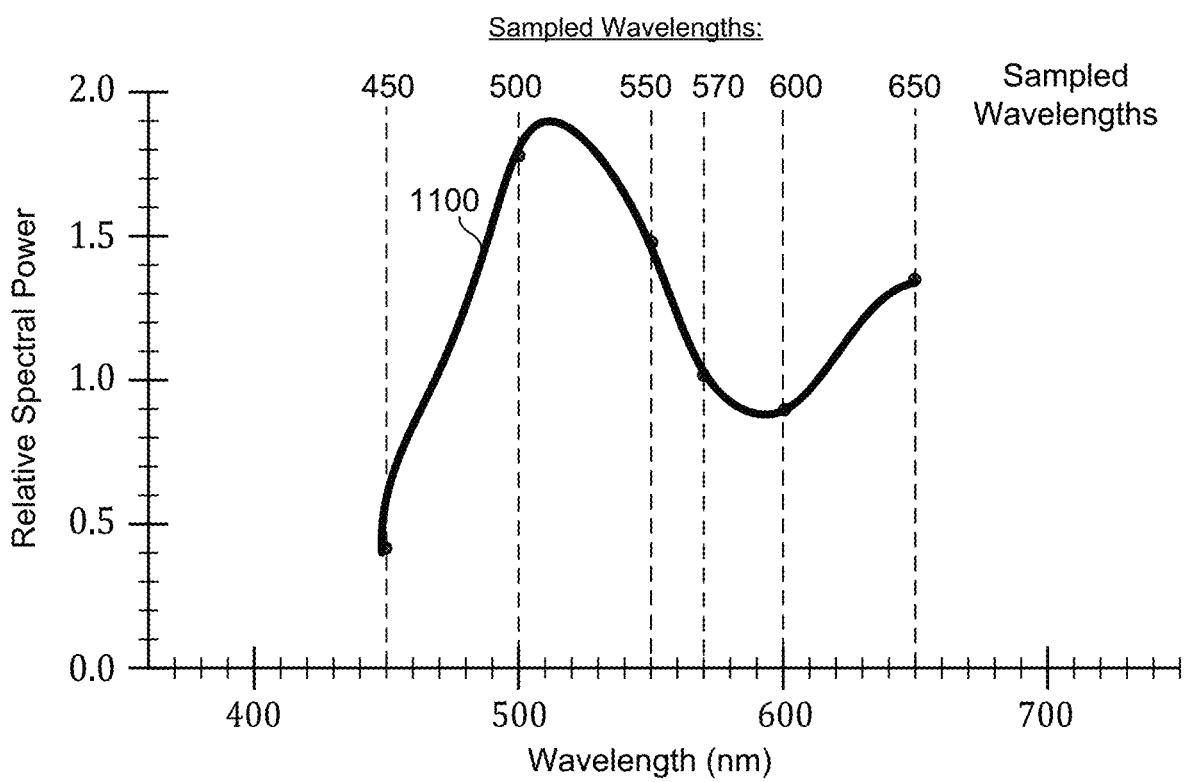

FIG. 11 illustrates an exemplary interpolated spectral power distribution of the six channel sensor readings shown in FIG. 10.

Figure 12:
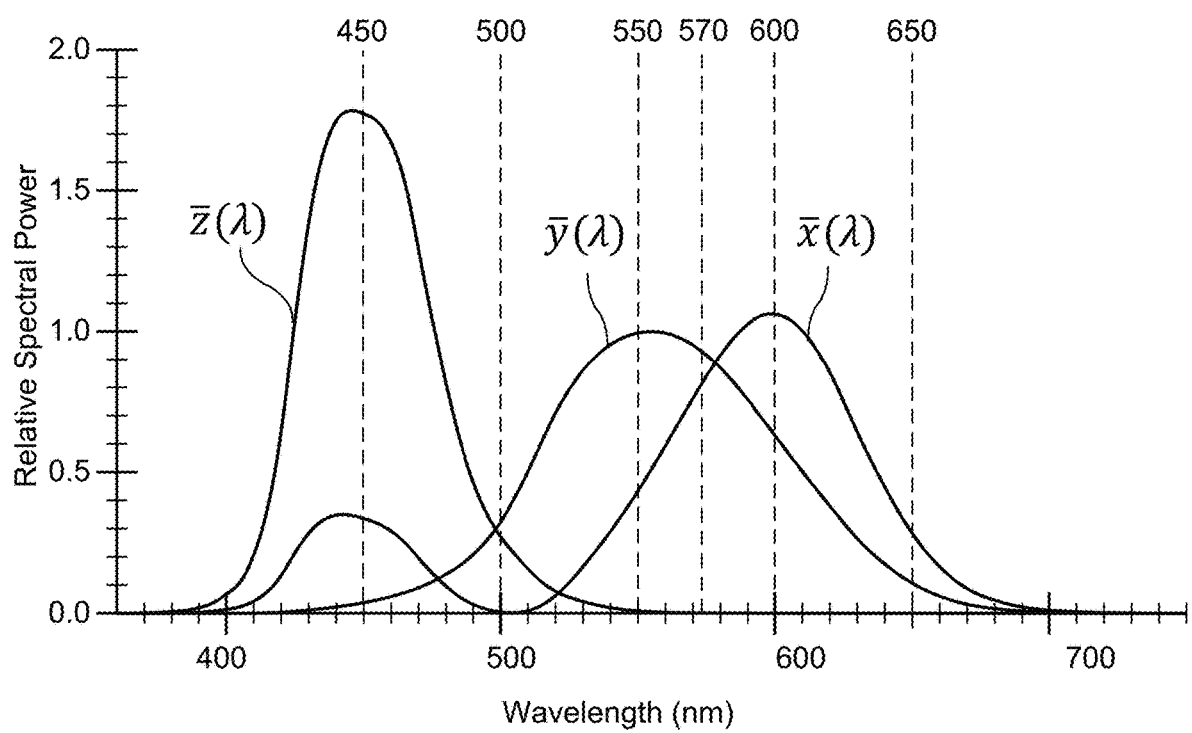

FIG. 12 shows the CIE XYZ standard observer color matching functions.

Figure 13:
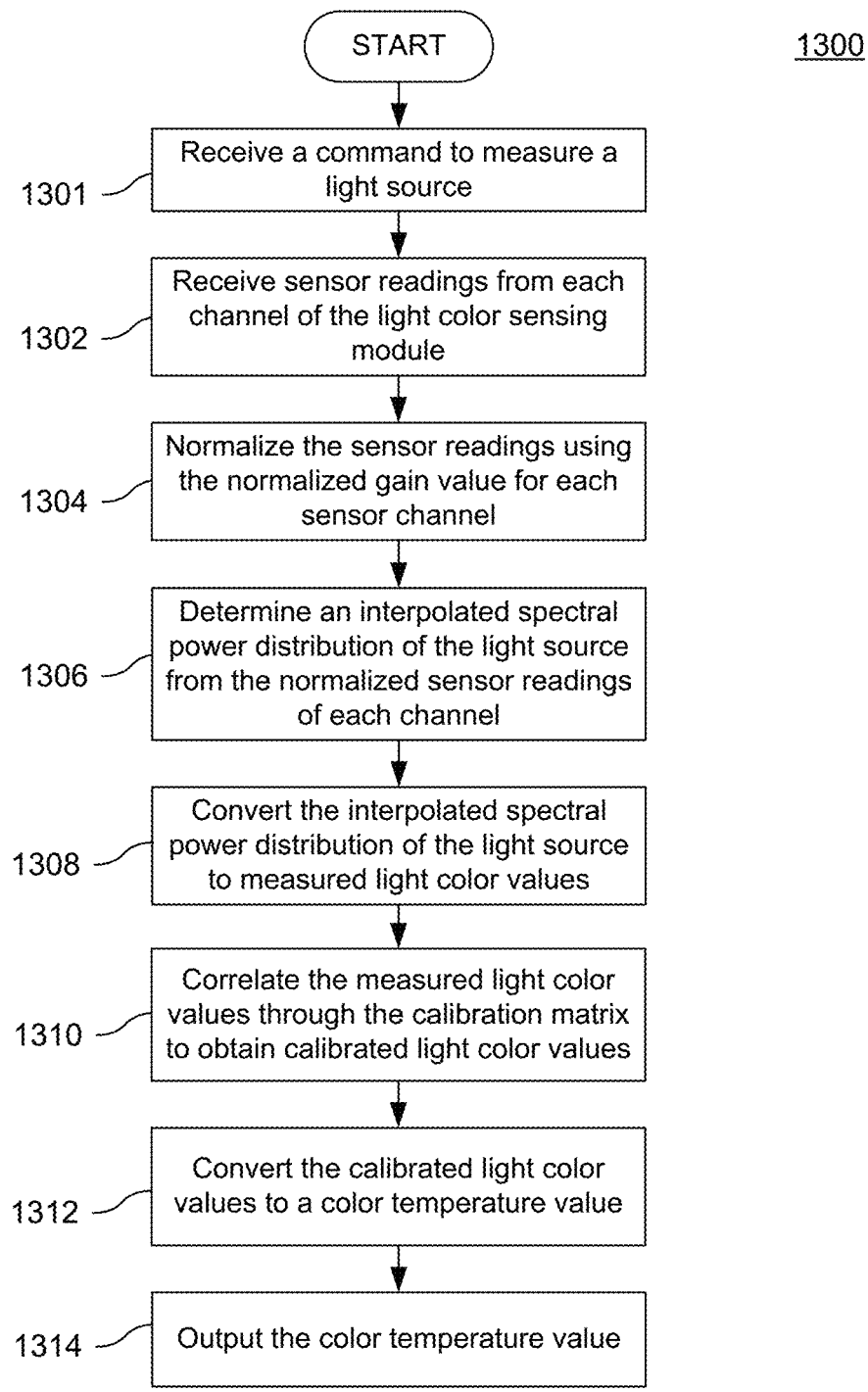

FIG. 13 shows a flowchart illustrating the steps for a method executed by the light color sensor to measure a color, and more particularly the color temperature, of light according to an embodiment.

Figure 14:
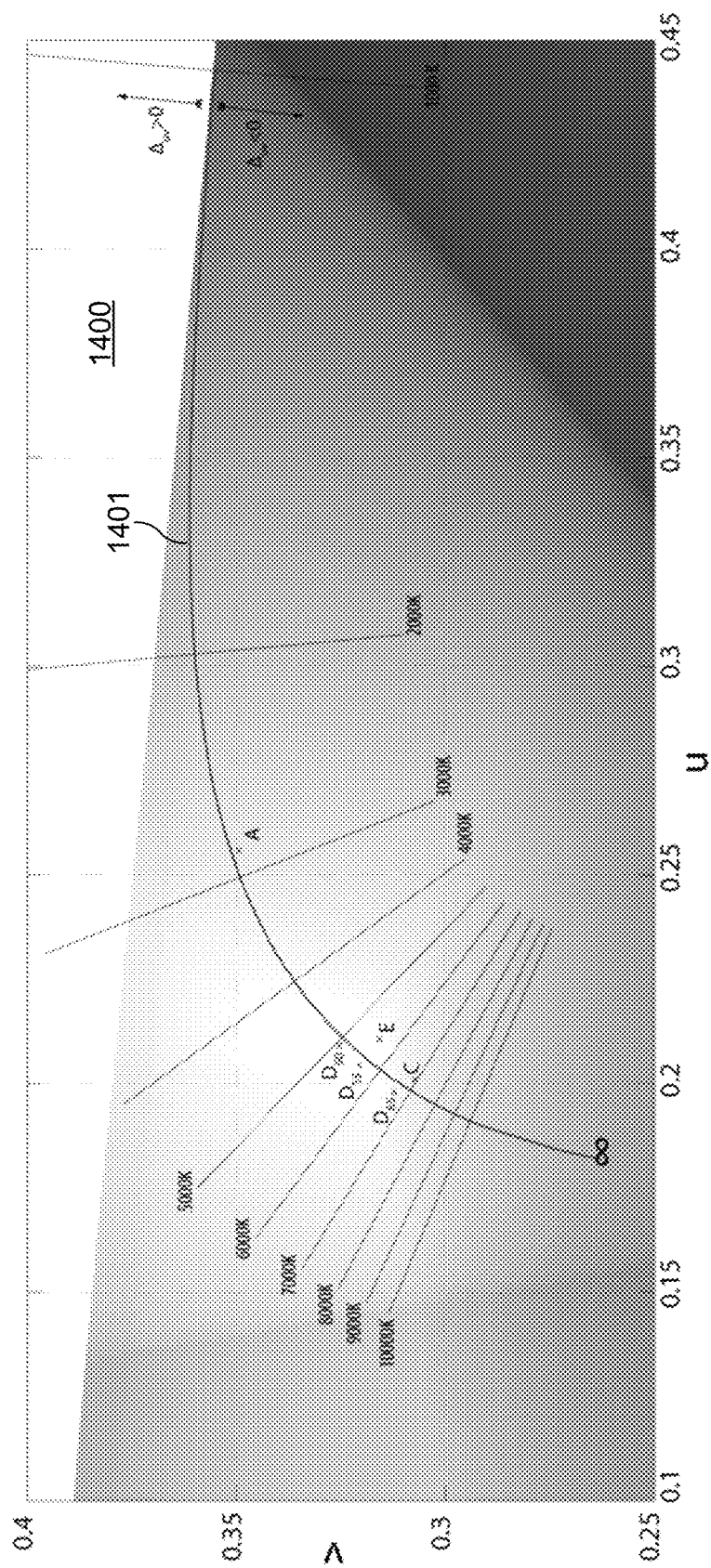

FIG. 14 shows an x, y chromaticity space with the Planckian locus black-body curve.

Figure 15:
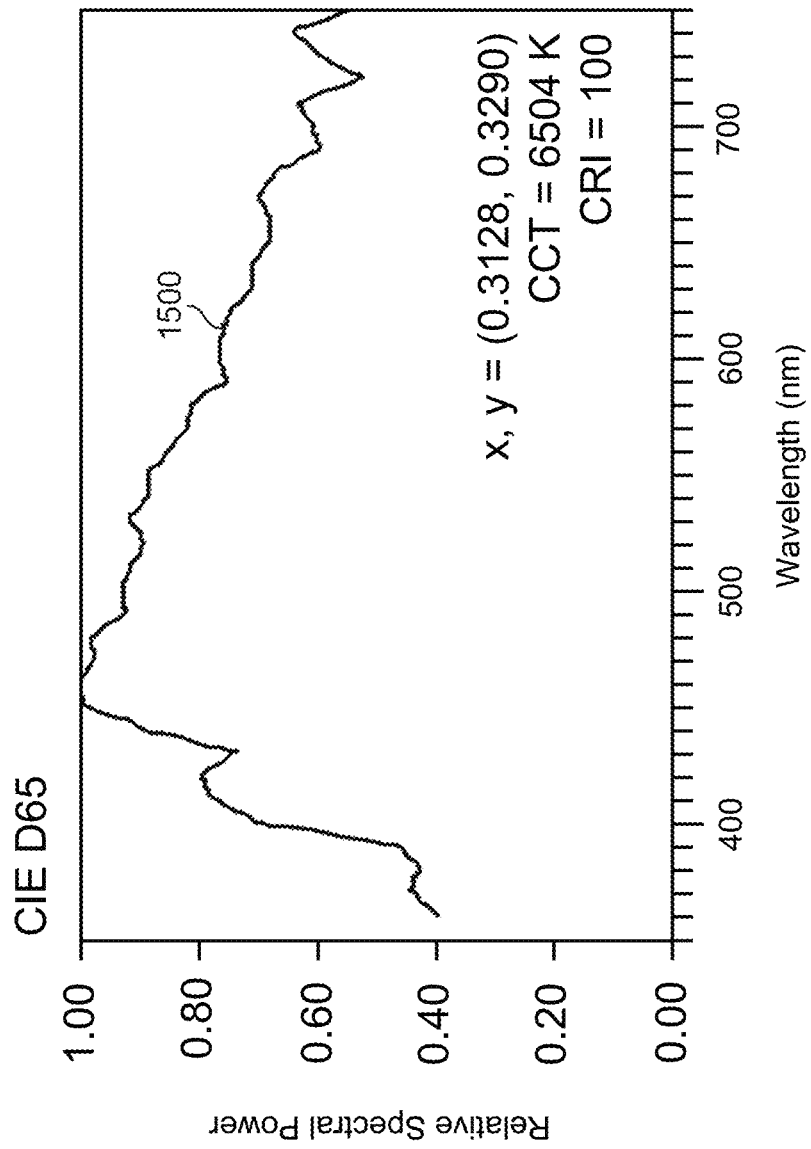

FIG. 15 illustrates an exemplary spectral power distribution of typical daylight.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

List of Reference Numbers for the Elements in the Drawings in Numerical Order

The following is a list of the major elements in the drawings in numerical order.

| 100 | Lighting Control System |
|---|---|
| 101 | Light Color Sensor |
| 104 | Lighting Control Device (s) |
| 105 | Lighting Control Processor |
| 106 | Lighting Load (s) |
| 108 | Junction Box |
| 110 | Interior Space |
| 112 | Sunlight |
| 201 | Processor |
| 202 | Light Color Sensing Module |
| 203 | Light Intensity Sensing Module |
| 205 | Memory |
| 206 | Network Interface |
| 209 | Visual Indicator |
| 210 | Power Supply |
| 300 | Body |
| 301 | First Housing Portion |
| 302 | Second Housing Portion |
| 303 | Printed Circuit Board (PCB) |
| 304 | First Dome Diffuser |
| 305 | Threaded Chase-Nipple |
| 306 | Second Flat Diffuser |
| 307 | Wire Leads |
| 308a-c | O-Rings |
| 310 | Threads |
| 312a-c | Circumferential Channels |
| 313 | Opening |
| 314 | Flange |
| 315 | Holes |
| 316 | Standoffs/Spacers |
| 317 | Screws |
| 318 | Dehumidifier Pads |
| 321 | Heating Resistors |
| 400 | Sun/Sunlight |
| 401 | Sunrise Position |
| 402 | Midday Position |
| 403 | Sunset Position |
| 410 | Horizon Line |
| 400 | Angle |
| 500 | Flowchart Illustrating the Steps for a Method of Calibrating the Light Color Sensor |
| 501-503 | Steps of Flowchart 500 |
| 600 | Flowchart Illustrating the Steps for a Method of Calibrating the Light Color Sensor to Determine a Normalizing Gain Value |
| 602-614 | Steps of Flowchart 600 |
| 700 | Test Fixture |
| 701 | Light Source |
| 702 | Testing Computer |
| 703 | Base |
| 704 | Processor |
| 705 | Memory |
| 706 | Power Source |
| 710 | Spectrometer |
| 800 | Spectral Power Distribution of a Halogen Lamp |
| 900 | Flowchart Illustrating the Steps for a Method of Calibrating the Light Color Sensor to Determine a Calibration Matrix |
| 902-918 | Steps of Flowchart 900 |
| 1000 | Spectral Power Distribution Graph |
| 1001-1006 | Exemplary Set of Six Channel Sensor Readings |
| 1100 | Exemplary Interpolated Spectral Power Distribution of the Six Channel Sensor Readings |
| 1300 | Flowchart Illustrating the Steps for a Method Executed By the Light Color Sensor to Measure a Color, or more particularly the Color Temperature, of Light |
| 1302-1314 | Steps of Flowchart 1300 |
| 1400 | x, y Chromaticity Space |
| 1401 | Planckian Locus Black-Body Curve |
| 1500 | Spectral Power Distribution of Typical Daylight. |

List of Acronyms Used in the Specification in Alphabetical Order

The following is a list of the acronyms used in the specification in alphabetical order.

| ADC | Analog to Digital Converter |
|---|---|
| ASIC | Application Specific Integrated Circuits |
| B | Blue |
| CAT5 | Category 5 Cable |
| CCT | Correlated Color Temperature |
| CIE | International Commission on Illumination |
| CPU | Central Processing Unit |
| ESD | Electrostatic Discharge |
| G | Green |
| GUI | Graphical User Interface |
| HVAC | Heating, Ventilation, and Air Conditioning |
| IR | Infrared |
| K | Kelvins |
| LAN | Local Area Network |
| LED | Light Emitting Diode |
| lux | Luminous Intensity/Luminosity |
| MCU | Microcontroller |
| nm | Nanometers |
| O | Orange |
| PCB | Printed Circuit Board |
| PoE | Power over Ethernet |
| PMMA | Poly (Methyl Methacrylate) |
| PTFE | Polytetrafluoroethylene |
| PWM | Pulse Width Modulation |
| R | Red |
| RAM | Random-Access Memory |
| RF | Radio Frequency |
| RGB | Red-Green-Blue |
| RISC | Reduced Instruction Set |
| ROM | Read-Only Memory |
| SPD | Spectral Power Distribution |
| Tt | Total-Light Transmittance |
| UV | Ultraviolet |
| V | Violet |
| W | White |
| Y | Yellow |

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, N.J.

The different aspects of the embodiments described herein pertain to the context of a light color sensor, but is not limited thereto, except as may be set forth expressly in the appended claims. Referring to FIG. 1, there is shown a lighting control system 100 comprising a light color sensor 101 according to an embodiment. The lighting control system 100 may be adapted to control one or more lighting loads 106 inside an interior space 110 and may further comprise a lighting control processor 105 and one or more lighting control devices 104. The lighting control system 100 may be installed in any type of interior space, such as an office building, conference room, classroom, hospital, retail space, commercial space, residential space, or the like.

According to an embodiment, each lighting load 106 may comprise at least one color changing light emitting diode (LED) array, such as a tunable white (i.e. 2200K-6000K) array or a chipset array with red (R), green (G), blue (B), and white (W) LEDs that can be combined by configuring their intensity to produce any desired color of light. The lighting load 106 may further comprise an LED driver that controls the LED array to produce desired color and light intensity. The lighting loads 106 may be wired or be wirelessly connected to the control processor 105 to receive control commands and in response change their lighting output.

According to an embodiment, the light color sensor 101 may be mounted inside or outside a building generally directed at the natural light source it meant to measure. For example, the light color sensor 101 may be mounted outdoors on a roof in an upward orientation facing the sky to measure the color as well as the intensity of outdoor ambient light, including direct and indirect natural sunlight 112. Mounting the sensor 101 outdoors in direct view of sunlight 112 will allow more accurate light readings. Accordingly, the sensor 101 needs to withstand extreme weather conditions. The sensor 101 may comprise a threaded chase-nipple 305 (FIG. 3) on its underside that may be used to clamp the sensor 101 to a surface via a threaded conduit nut (not shown). For example, the sensor 101 may be mounted to an outdoor rated junction box 108 mounted on a building via a conduit knockout and may comprise a plurality of wire leads 307 (FIG. 3) extending into the junction box 108 to connect the sensor 101 to the lighting control system 100. Although according to another embodiment, the light color sensor unit 101 may be mounted inside the spade 110 in direction facing a window or a skylight to sample ambient light through the window.

The light color sensor 101 may be adapted to detect the color of visible light in terms of its spectral power distribution and it may be adapted to output a light color value, for example such a correlated color temperature (CCT), as well as light intensity value, such as luminosity (lux), of natural ambient light. According to one embodiment, the light color sensor 101 may be directly connected to and directly control the lighting load 106 or it may communicate its output to the LED driver of the lighting load that controls the light output of the LED array. According to another embodiment, the light color sensor 101 is adapted to communicate its output to the control processor 105, a lighting control device 104, such as a dimmer, or another intermediary device, which in turn may use the sensor output to control the lighting loads 106. In addition, although the control system 100 discussed herein is adapted to control lighting based on the detected color of an exterior light source, the detected color may be also used to control other types of controllable devices based on outdoor lighting conditions, such as audiovisual devices, shading devices (e.g., motorized roller shades), as well as heating, ventilation, and air conditioning (HVAC) devices, among others. Furthermore, the light color sensor 101 may be also used to detect color of artificial light sources, or a combination of natural light and artificial light sources.

The light color sensor 101 of the present embodiments may be used in various applications. The light color sensor 101 may determine the color of the outdoor natural light to drive the indoor lighting so as to match the color temperatures of the interior space 110 to that of the exterior lighting conditions. This allows system 100 to maintain the occupants' natural circadian rhythm. This application may also be used for decorative effects, for example, to fool occupants into believing they are outside. This will give the effect of a space that's open to the air, even if such a space may not contain any windows. So during noon hours with exterior color temperature of about 5500K, the lighting color temperature inside may be adjusted to match that. On the other hand, the interior light color temperature may match the color temperature of an overcast day with a color temperature reading of about 7000K. As a result, the interior space 110 may look like all of the light is coming from the natural lighting source 112 rather than the artificial lighting source 106.

Another application is to determine the outdoor light color temperature conditions and manipulate the interior space to maintain consistent luminous power density, for example of a work surface, no matter what the outdoor conditions are. In another embodiment, in patient care, for example, when the outdoor color temperature readings are undesired, the interior lighting loads 106 may be used to offset that by augmenting interior lighting to a different temperature to improve patient health.

Referring to FIG. 2, there is shown an illustrative block diagram of the light color sensor 101 according to an embodiment. Light color sensor 101 may include various circuit components configured for detecting the color of light, as well as light intensity, and transmitting its readings or commands to lighting loads 106 either directly or via other control devices, such as 104 and 105.

Light color sensor 101 may comprise a power supply 210 configured for providing power to the various circuit components of the light color sensor 101. In one embodiment, the power supply 210 may comprise a battery, such as a BR2032 coin cell battery. In another embodiment, sensor 101 may be connected to line voltage. Power supply 210 may further comprise one or more power converters and regulators to provide power levels required by the electrical or circuit components, such as a buck regulator. In addition, the power supply 210 may comprise surge, electrostatic discharge (ESD), misfire, and/or similar protection components or circuits.

Light color sensor 101 can further comprise a processor 201. The processor 201 can represent a central processing unit (CPU), one or more microprocessors, "general purpose" microprocessors, a combination of general and special purpose microprocessors, or application specific integrated circuits (ASICs). Additionally, or alternatively, the processor 201 can include one or more reduced instruction set (RISC) processors, video processors, or related chip sets. The processor 201 can provide processing capability to execute an operating system, run various applications, and/or provide processing for one or more of the techniques and functions described herein. The processor 201 can process various commands and perform operations, such as interpreting light color and light intensity sensor readings, allowing the light color sensor 101 to join a communication network, or the like.

Light color sensor 101 can further include one or more memory sources 205, such as a main memory and/or a nonvolatile memory. Memory 205 can be communicably coupled to the processor 201 and can store data and executable code. Memory 205 can represent volatile memory such as random-access memory (RAM), and/or nonvolatile memory, such as read-only memory (ROM), hard disk drive, Flash memory, or the like. Memory 205 can store data files, software for implementing the functions on the control processor 201, as well as network connection information. According to an embodiment, the memory 205 and processor 201 may be incorporated in a single microcontroller (MCU).

Light color sensor 101 may further comprise a network interface 206, such as a wired or a wireless interface, configured for bidirectional communication on a communication network with other electronic devices, such as the lighting control device 104, the central control processor 105, or the like. A wired interface, for example, may be configured for bidirectional communication with other devices over a wired network. The wired interface can represent, for example, an Ethernet or a Cresnet® port or wire leads 307 (FIG. 3). Cresnet® provides a network wiring solution for Crestron® keypads, lighting controls, thermostats, and other devices. The Cresnet® bus offers wiring and configuration, carrying bidirectional communication and 24 VDC power to each device over a simple 4-conductor cable. On the other hand, the wireless interface can comprise a radio frequency (RF) transceiver, an infrared (IR) transceiver, or other communication technologies known to those skilled in the art. The wireless interface may communicate using the infiNET EX® protocol from Crestron Electronics, Inc. of Rockleigh, N.J., ZigBee® protocol from ZigBee Alliance, via Bluetooth transmission, or the like.

In various aspects of the embodiments, the network interface 206 and/or power supply 210 can comprise a Power over Ethernet (PoE) interface. The light color sensor 101 can receive both the electric power signal and transmit readings or control commands via a communication network through the PoE interface. For example, the PoE interface may be connected through category 5 cable (CAT5) to a local area network (LAN) which contains both a power supply and multiple control points and signal generators.

Light color sensor 101 may further comprise a visual indicator 209 to display a status of the sensor 101, identity functionality, as well as for any error reporting for diagnostics. The visual indicator 209 may comprise one or more LEDs, such as red and green LEDs. The visual indicator 209 may indicate whether the light color sensor 101 is trying to join a network, when it is configured, or the like.

Light color sensor 101 may comprise a light color sensing module 202 adapted for detecting color of visible light regardless of luminance. The light color sensing module 202 may comprise a multichannel spectral sensor, an RGB sensor, an XYZ sensor, or the like. It can measure light over a wide spectrum and it can either provide narrowband or wideband readings. For example, the light color sensing module 202 may comprise a narrowband six-channel multispectral sensor chipset with six photodiodes for sensing separate color components of light and providing analog channel readings over six channels. The analog channel readings may be converted using analog to digital converters (ADCs) into digital values. Although the description herein is described with a reference to a six-channel sensor module, a sensor module with more or less channels may be also utilized. The sensor chipset can also comprise one or more filters, such as Gaussian filters, to control the light entering the sensor array.

Light color sensor 101 may further comprise a light intensity sensing module 203 configured for detecting and measuring light intensities. According to an embodiment, the light color sensing module 202 and the light intensity sensing module 203 may be integrated in the same chipset component. According to another embodiment, modules 202 and 203 may be separate components. For example, the light intensity sensing module 203 can comprise an internal photocell with 0-65535 lux (0-6089 foot-candles) light sensing, such as an open-loop daylight sensor, to measures light intensity from natural daylight. Light intensity sensing module 203 may monitor natural daylight and output a light intensity reading, for example in a form of a luminous intensity (lux) of the observed light. Using the readings, the light color sensor 101 can signal the lighting control system 100 to raise or lower the lights according to natural light fluctuations, reducing energy usage while maintaining a consistent light intensity for a more efficient and comfortable work or living space.

Referring to FIG. 3, there is shown an exploded view of the light color sensor 101. Light color sensor 101 may comprise a sensor body 300 having a first housing portion 301 connected to a second housing portion 302 via threads 310. According to an embodiment, the sensor body 300 may comprise a plastic material, such as polytetrafluoroethylene (PTFE), or Teflon®, or equivalent plastic that can withstand outdoor exposure for a prolonged period of time. The color of the sensor body 300 may comprise a natural white color, which allows the body 101 to reflect and not absorb light and heat. The first housing portion 301 may comprise the threaded chase-nipple 305 extending from its underside. One or more o-rings, such as three o-rings 308a-c, may be compressed within various circumferential channels 312a-b between the first and second housing portions 301 and 302 to provide a water tight seal, as shown in greater detail in FIG. 4. The sensor body 300 may house a printed circuit board (PCB) 303, a first dome diffuser 304, and a second flat diffuser 306 therein.

The PCB 303 may comprise the various electrical components of the light color sensor 101 as discussed above with reference to FIG. 2, including the light color sensing module 202. The light color sensor 101 may further comprise flying leads 307 connected to the backside of the PCB 303 and extending through and out of the chase-nipple 305. For example, a Cresnet® connection can be implemented via the flying leads 307 to provide communications as well as power to the light color sensor 101. According to an embodiment, the PCB 303 may contain the visual indicator 209, such as an LED, thereon, which may be visible through the first and second diffusers 304 and 306, to maintain the watertight seal. When turned on, the dome shaped diffuser 304 may diffuse the light emitted from the visual indicator 209 causing the diffuser 304 to light up and provide visual signal to the user.

The first diffuser 304 may be generally domed in shape and may extend out of the sensor body 300 through an opening 313 in the second housing portion 302 to capture sunlight and direct it to the light color sensing module 202 on PCB 303. The dome diffuser 304 may comprise a flange 314 configured to be secured between the first hosing portion 301 and the second housing portion 302 to retain the first diffuser 304 by the sensor body 300. The shape of the dome diffuser helps capture light from all angles, which brings in more light to the sensor and provides more accurate readings. According to an embodiment, the dome diffuser 304 is sufficiently dome shaped in order to gather more incident sunlight from near the horizon line. This allows the light color sensor 101 to detect the color of light more accurately during sunrise and sunset. Referring to FIG. 4, there is shown a cross-sectional view of the light color sensor 101 according to an embodiment. Because the first diffuser 304 is dome shaped, the sun 400 remains in its view regardless of the sky position of the sun 400. As shown in FIG. 4, the sun 400 is substantially incident or normal to the outer surface of the first diffuser 304 during the entire travel of the sun 400 from sunrise 401, midday 402, and to sunset 403 positions. As such, the dome diffuser 304 can collect light from variety of angles, even when the sun 400 is over the horizon line 410, thereby increasing the optics on the side of the light color sensor 101 as it lets light through from a wide area. A flat diffuser or an insufficiently rounded diffuser, on the other hand, will not be able to effectively gather sunlight throughout the day.

The dome diffuser 304 may comprise a white diffused material or layer that is exposed to the sunlight. The dome diffuser 304 may comprise a plastic material, such as polycarbonate, polycarbonate blend, poly(methyl methacrylate) (PMMA), or the like. According to an embodiment, the first diffuser 304 may comprise Panlite® ML-6500ZDL polycarbonate material available from Teijin Limited. In other embodiments, a glass material, acrylic glass, or other similar materials capable of providing sufficient diffusion levels may be utilized. The diffusion of the first diffuser 304 allows light to refract and reflect randomly and thereby scatter around and be collected by the dome diffuser 304. As such, the diffusion of the first diffuser 304 allows the first diffuser 304 to collect natural light, limit glare of the sun, spread light evenly, and reduce hard shadows, thereby preserving the normal color temperature of the sunlight. Diffusing light, instead of focusing light like lenses, allows the light color sensor 101 to generate more accurate readings. Using a lens, instead of a dome diffuser 304, on the other hand, will focus light, which will produce inaccurate readings. Although in addition to the dome diffuser 304, the light color sensing module 202 may still contain a lens over it to provide a light collecting function.

According to one embodiment, the first diffuser may comprise a diffusion level of about above 50% (with Total-light transmittance (Tt) at about below 50%). However, it is difficult to achieve sufficient as well as consistent diffusion levels throughout the entire surface of a dome shaped diffuser 304 in a cost effective manner. Low diffusion levels do not provide accurate results, while high diffusion levels, for example above 50%, provide better and consistent readings. Materials with high levels of diffusion that can be molded, such as via injection molding, into or onto a dome shape may be cost prohibitive. A cheaper method would be to form a white diffusion layer on the inner surface of the dome diffuser 304. However, this method fails to achieve consistent diffusion levels throughout the entire surface of a dome shaped diffuser. For example, thermoforming a plastic diffusion layer within the dome diffuser 304 causes the plastic layer to get very thin at the top as compared to the sides of the dome diffuser 304, losing diffusion consistency and thereby accuracy of color temperature readings.

Accordingly, the light color sensor 101 may comprises a second diffuser 306 positioned underneath the dome diffuser 304—forming a double diffusion construction. The secondary flat diffuser 306 is adapted to further diffuse the light to reduce light concentration and prevent inaccurate readings. The second diffuser 306 may comprise a generally flat shape. The second diffuser 306 may reside over the PCB 303 at a distance using spacers 316 and may contain holes 315 that receive screws 317 for mounting the second diffuser 306 and the PCB 303 to the first housing portion 301.

According to an embodiment, the second diffuser 306 may comprise a substantially triangular shape with cutouts to expose heating elements, such as three heating resistors 321, such that the second diffuser 306 resides in between and adjacent to the heating resistors 321 without covering them. Heating resistors 321 may be driven by the processor 201 to achieve desired heat to prevent ice or snow accumulations on the outer dome diffuser 304, which may cover the view of the light color sensing module 202 located underneath. However, the second flat diffuser 306 may comprise other shapes, such as a circular shape.

The second diffuser 306 may comprise a white or white coated glass or plastic material. According to an embodiment, the second diffuser 306 may comprise a polycarbonate material, such as PALSUN® SG White polycarbonate sheet, available from PALRAM Industries Ltd. The second diffuser 306 may comprise diffusion levels of above about 50% (with total-light transmittance (Tt) at about below 50%). For example, the flat diffuser 306 may comprise 28% Total-light transmittance (Tt). Because the second diffuser 306 is flat, consistent diffusion levels can be achieved throughout the entire surface of the second diffuser 306 in an effective and relatively inexpensive manner. The flat shaped diffuser 306 points towards the dome shaped diffuser 304 and is used to collect the light collected by the dome shaped diffuser 304. This allows the use a dome diffuser 304 with higher transmittance levels, such as 65% Total-light transmittance (Tt). However, the second flat diffuser 306 may be also used with a dome diffuser 304 with lower transmittance levels to improve color temperature accuracy. Particularly, referring to FIG. 4, the second flat diffuser 306 is also used to collect sunlight that comes in at a steep angle, such as angle 412, with respect to light color sensing module 202 during sunrise 401 and sunset 403. The second diffuser 306 collects the light and directs it down where it is read by the light color sensing module 202. By further diffusing the incoming light, the second diffuser 306 eliminates any further dark shadows and prevents it from becoming dark or dull. Because the incoming light is sufficiently diffused via the double diffusion layers 304 and 306, it substantially retains its natural color, which is read by the light color sensing module 202, resulting in substantially accurate readings.

According to an embodiment, the first and/or second diffuser 304/306 further comprise materials with weather resistance characteristics. Materials such as polycarbonates and PMMA do not yellow over time like other plastics and can withstand outdoor conditions. In addition, the first and/or second diffuser 304/306 can comprise materials with ultraviolet (UV) radiation blocking properties, for example via UV protection films or co-extruded UV protection layers on one or two sides of the diffuser. UV radiation blocking properties allow the transmission of the natural daylight while reflecting the sun's heat due to infrared radiation. This both reduces the deterioration of the diffusers themselves, as well as reducing the heat buildup in the light color sensor 101.

In addition, the light color sensor 101 may comprise one or more dehumidifier pads 318 disposed within the sensor body 300 which may comprise porous material to collect moisture that gets into the unit and prevent the diffusers 304 and 306 from fogging up for more accurate readings.

The present embodiments further pertain to systems, methods, and modes for calibrating the light color sensor 101. Referring to FIG. 15, there is shown a spectral power distribution (SPD) 1500 of CIE Standard Illuminant D65 defined by the International Commission on Illumination (CIE) for a typical daylight at 6504 K. Light is a form of electromagnetic energy that may be defined by a spectral power distribution, such as SPD 1500, which characterizes how much energy or power is emitted at each wavelength in the visible light spectrum. Visible light spectrum is the portion range of wavelengths in the electromagnetic spectrum that is visible to the human eye. A typical human eye responds to wavelengths from about 380 nanometers (nm) to about 740 nm. Each individual wavelength within the spectrum of visible light wavelengths is representative of a particular color, which can be grouped and summarized as follows:

TABLE 1

| Color | Wavelength |
|---|---|
| Violet | 380-450 nm |
| Blue | 450-495 nm |
| Green | 495-570 nm |
| Yellow | 570-590 nm |
| Orange | 590-620 nm |
| Red | 620-750 nm |

Spectral power distribution of a light contains a substantially complete basic physical data about the light and serves as the starting point for quantitative analyses of color. The human eye perceives white light when all the wavelengths of the visible light spectrum strike the human eye at the same time. For example, typical daylight represented by the spectral power distribution 1500 will appear bluish white since it emits spectral power at all visible wavelengths (between 380 and 700 nm) with higher relative spectral power at 450 nm, which corresponds to blue light.

To determine the color of a light source, such as daylight, the light source needs to be sampled at various wavelengths to detect the spectral power distribution of the light. A spectrometer, for example, may comprise hundreds or thousands of channels each detecting the spectral power of the light source at a different wavelength such that substantially an entire spectrum can be captured. However, using a spectrometer is cost prohibitive for lighting control in residential or commercial applications. Lower cost visible light spectrum sensor chipsets available on the market, such as the light color sensing module 202, sample only a small number of wavelengths and thus without any effective calibration produce inconsistent and inaccurate results. In addition, raw spectral sensor readings of visible light spectrum sensors do not have much meaning on their own. Accordingly, according to the system and method discussed herein, the light color sensing module 202 is calibrated to a known light source and processed to resemble a meaningful representation of the color of light.

As discussed above, the light color sensing module 202 can comprise a narrowband multi-spectral sensor comprising six spectral channels adapted to sense light at six different wavelengths and report six spectral power values in units of watts per meter. The six visible light channels may detect the spectral power of the measured light in the following wavelengths: violet (V) channel at 450 nm, blue (B) channel at 500 nm, green (G) channel at 550 nm, yellow (Y) channel at 570 nm, orange (O) channel at 600 nm, and red (R) channel at 650 nm of light, each channel with 40 nm full-width half-max detection. Sensors with lower or higher number of channels may also be implemented, although lower number of channels will significantly reduce resolution of the sensor.

According to the present embodiments, the raw sensor readings received from the light color sensing module 202 may be calibrated using the methods described below and converted to a light color quantifying value(s), such as correlated color temperature (CCT), Lux, x,y, XYZ, or RGB color values. Referring to FIG. 5, there is shown a flowchart 500 illustrating the steps for a method of calibrating the light color sensor 101. In step 501, the light color sensing module 202 may be first calibrated to an artificial light source outside of the sensor body 300 of the light color sensor 101 to determine and store a module gain value for each sensor channel. For example, the light color sensing module 202 can be placed in a test fixture having an artificial light source placed at a distance away from light color sensing module 202. For example, the V, B, G, Y, and O channels may be measured using a 5700 K white LED light source and the R channel may be measured using an incandescent light. During testing, the light source may be turned on to shine on the light color sensing module 202. The test fixture may read each of the six channels of the module 202, compare the raw sensor reading of each channel to test data of the light source, and determine any errors by computing a module gain value for that channel. The determined module gain value of each channel may be recorded in a memory of the light color sensing module 202. Thereafter, when measuring light, the light color sensing module 202 may factor in the stored module gain value for each channel by multiplying the raw sensor reading by the module gain value for the corresponding channel to yield a calibrated module reading for that channel. According to a further embodiment, in addition to the module gain value, an offset value may be determined for each channel and accounted for by the light color sensing module 202 to yield the calibrated module readings. Step 501 is optional and the calibration method of the present embodiments may start at step 502.

In step 502, the light color sensor 101 is calibrated to an artificial light source with the light color sensing module 202 located within the sensor body 300 to determine and store a normalizing gain value for each sensor channel according to the method shown in FIG. 6. The normalizing gain value is used to factor out variation between any two light color sensor units. Particularly, the light color sensor 101 is assembled such that the light color sensing module 202 is located below the first diffuser 304 and the second diffuser 306. The manufacturing deficiencies of the first and second diffusers 304 and 306 tend to effect the optics in terms of diffusion of the first and second diffusers 304 and 306 and thereby may alter the final sensor readings of the light color sensing module 202 if not accounted for in a calibration process—causing readings of one sensor unit 101 to be different than another sensor unit 101. Such manufacturing deficiencies comprise variations in the characteristics and properties of the first and second diffusers 304 and 306 and their assembly within the sensor unit 101, such as variations in impurities, material composition, thickness, diffusion properties, positioning and distance the first and second diffusers 304 and 306 are mounted with respect to each other and with respect to the light color sensing module 202, or the like. For example, at cooler frequencies, such as 400 nm, the diffuser characteristics may vary the amount the blue color is excited from one sensor unit to another. Without calibrating the light color sensing module 202 within the sensor body 300 a plurality of sensors 101 installed within the same space will produce different sensor readings under the same light conditions. Calibrating light color sensing module 202 within the sensor body 300 normalizes these sensor readings to help alleviate any manufacturing deficiencies in the two light diffusers 304 and 306 used in the final product such that each produced light color sensor 101 will report sensor readings that closely match one another when placed in the same exact light conditions. In addition, each channel of the light color sensing module 202 may be independently calibrated since the manufacturing deficiencies may effect each channel reading differently.

Referring to FIG. 7, the light color sensor 101 may be calibrated using a test fixture 700. Test fixture 700 may comprise a base 703, an artificial light source 701, and a testing computer 702. Testing computer 702 may comprise a processor 704, a memory 705, and a power source 706. The base 703 may be configured to receive the threaded chase-nipple 305 and the wire leads 307 of the light color sensor 101 such that the dome diffuser 304 of the light color sensor 101 faces the light source 701. The test fixture 700 can further comprise a calibrated spectrometer 710 adapted to read the spectral power distribution of the light source 701. Spectrometer 710 and base 703 may be adjacently placed as shown in FIG. 7. According to another embodiment, the spectrometer 710 may be positioned underneath the base 703 such that the spectrometer 710 and base 703 are centered with respect to the light source 701—in practice the spectrometer 710 may take a reading of the light source 701 and then the light color sensor 101 may be placed on base 703 over the spectrometer 710 to take the reading at substantially the same position with respect to the light source 701. The light source 701 may be positioned at a distance from the device to be tested, in this case the light color sensor 101. The light source 701 may comprise a wideband lamp, such as a halogen lamp, comprising substantially liner spectral power distribution across the wavelengths of the visible light spectrum. According to another embodiment, light source 701 may comprise other types of lamps, such as a xenon lamp, a fluorescent lamp, ceramic metal halide lamps, or the like. The light source 701 may comprise a single temperature of about 3200 Kelvin. FIG. 8 illustrates an exemplary spectral power distribution 800 of a halogen lamp light source 701 comprising a substantially linear curve.

Referring to FIGS. 6 and 7, in step 602, the test computer 702 may store a target representation of the spectral power distribution of the test light source 701. Such representation may comprise a target slope value and may also comprise a target slope intercept value of the linear curve 800 of the spectral power distribution of the linear light source 701. According to one embodiment, the target representation of the spectral power distribution of the test light source 701 may be determined based on manufacturing specification of the light source 701 or an initial measurement of the light source 701 using the test spectrometer 710. However, when using any artificial light source 701 at production (manufacturing) overtime, the bulb initial brightness may degrade over time. In a halogen type light source 701, the measured lux output may be continuously reduced as the filament continues to heat up, burn, and remain turned on for a long duration. This may affect the stability of the spectrum of the light source 701, resulting in different sensor readings depending on when the light source 701 was tested over time. To alleviate this problem, the test setup spectrometer 710 may be used to consistently measure and determine the spectral power distribution of the light source 701, which can be used by the test computer 702 to determine an offset value. This offset value can be computed using an initial spectrum sample of the calibrated artificial light source 701 when it is freshly installed, then subtracted with a daily or repeated test snapshot of the current sampled spectrum. This offset value can be applied to the readings of each spectrum channel of the light color sensing module 202 during the calibration process or it can be used to consistently update the stored target representation of the spectral power distribution of the light source 701 to account for its degradation over time.

In step 606, the light color sensor 101 is placed within and electrically connected to the test fixture 700, and particularly to the processor 704 and power source 706, to power up the electrical components of the sensor 101 and to receive sensor readings of the light color sensing module 202. In step 606, the light source 701 is turned on to shine on the light color sensor 101. In step 608, the testing computer 702 may receive test sensor readings from each of the six channels of the light color sensing module 202. These test sensor readings may be raw sensor readings or they may comprise calibrated module sensor readings by multiplying the raw sensor readings by the module gain value for each sensor channel determined in step 501 of FIG. 5 discussed above. Additionally, the light color sensor 101 may obtain test sensor readings for a convergence period by taking a plurality of samples of the sensor readings, for example 10 samples, for robustness. The plurality of the sensor reading samples for each sensor channel may be captured as calibration data in a buffer of memory 705 of the test fixture 700 and the buffered sensor reading samples may be averaged. Additionally, faulty sensor reading samples that significantly differ from the other sensor reading samples may be discarded.

Next, the testing computer 702 is adapted to compare the test sensor readings to the target light output of the light source 701 to determine any errors. According to one embodiment, a one point calibration may be performed by identifying slope errors and computing a gain value. Particularly, in step 610 the testing computer 702 determines a test representation of the spectral power distribution of the light source 701 for each channel. This test representation may comprise a test slope value—which represents the slope of the spectral power distribution 800 of the artificial light source 701. According to one embodiment, two measurements may be taken by the light color sensor 101 at two power levels of the light source 701 in order to calculate the test slope value. According to another embodiment, where offset errors are small, it could be presumed that the spectral power of the light source 701 at about 380 nanometers is zero. The computer 702 may turn on the light source 701 at about 50% and sample the light color sensor 101 to receive the test sensor readings. For each sensor channel, the computer 702 may then compute a test slope value of a linear curve between a zero spectral power value at about 380 nanometers and the received sensor reading for the corresponding channel.

In step 612, the computer 702 may determine a normalizing gain value, or the amount by which a sensor reading needs to be amplified, for each sensor channel by comparing the test representation of the spectral distribution of the artificial light source 701 (e.g., the test slope value) to the target representation of the spectral distribution of the artificial light source 701 (e.g., the target slope value). This normalizing gain value may be positive or negative. For a six channel light color sensing module 202, six independent normalizing gain values may be determined. In addition, because of the aforementioned manufacturing deficiencies, each sensor unit 101 will comprise a different normalizing gain value for the same channel wavelength. Then, in step 614, the normalizing gain values may be stored in memory 205 of the light color sensor 101. These normalizing gain values may be used by the light color sensor 101 to amplify the sensor readings to yield normalized sensor readings by multiplying the sensor readings for each channel by the corresponding normalizing gain value, as further discussed below.

According to a further embodiment, offset errors may be also accounted for by determining a normalizing offset value for each sensor channel by using the stored target slope intercept value of the linear curve 800 and determining the offset between the test linear curve and the target linear curve 800 of the spectral power distribution of the light source 701. These normalizing offset values can be stored in memory 205 and be also accounted for when measuring light by the light color sensing module 202.

Referring back to FIG. 5, in step 503 the light color sensor 101 stores a calibration matrix determined by calibrating a test light color sensor to an ambient light source with the light color sensing module 202 within the sensor body 300 according to the method shown in FIG. 9. Since the sensor readings of the light color sensor 101 are normalized using the normalizing gain value such that any two sensors 101 will produce the same readings, only a single test light color sensor unit 101 needs to be calibrated to an ambient light source during manufacturing to yield a single calibration matrix. This single calibration matrix may be uploaded to and stored and used by a plurality of light color sensor units 101. Without normalizing the sensor readings in step 502, different calibration matrixes will need to be developed for each light color sensor unit 101 to account for manufacturing deficiencies described above—causing significant delays in manufacturing process. The normalizing step 502 allows the development of a single matrix that can be used across a plurality of sensor units. This allows for a development of a robust calibration matrix using a vast amount of samples taken over a prolonged period of time under different lighting conditions as discussed below. In addition, this allows the calibration matrix to be updated to account for any errors or inconsistencies and be uploaded to the sensor units 101 in future via remote firmware updates. As further discussed below, the calibration matrix maps test sensor readings of an ambient light source determined by the test light color sensor to that of target sensor readings from a calibrated spectrometer, which produces substantially accurate results since it contains a large amount of channels. Variations in diffuser plastics can cause specific wavelengths to be stronger or weaker in varying light conditions, which may shift the final sensor data result to a cooler or warmer direction. The purpose of this additional calibration is to further ensure that the resulting sensor output is substantially true to the current light conditions and closely resembles a substantially accurate higher channel count of a spectrometer when placed in the same location.

Referring to FIG. 9, in step 902, a light color sensor unit 101 is placed within and connected to a test fixture. This test fixture can comprise the test fixture 700 shown in FIG. 7, but it may comprise a different text fixture. Instead of comprising an artificial light source, the test fixture 700 may be placed in an environment to test an ambient light source 701—for example by placing the test fixture 700 outside to measure direct or indirect sunlight. In step 906 the test fixture 700 receives test sensor readings from each channel of the light color sensing module 202—in this example six sensor readings. These sensor readings may be raw sensor readings or they may comprise calibrated module sensor readings by multiplying the raw sensor readings by the module gain value for each sensor channel determined in step 501 of FIG. 5 discussed above. In step 908, the sensor 101 normalizes the test sensor readings using the normalizing gain value for each sensor channel that was determined according to method of FIG. 6. Particularly, the sensor 101 retrieves the normalizing gain values from memory 205 and multiplies the sensor reading of each sensor channel by the stored normalizing gain values for the respective sensor channel to yield normalized sensor readings.

FIG. 10 illustrates an exemplary set of the six channel sensor readings 1001-1006 on a spectral power distribution graph 1000, namely at the following wavelengths: 450, 500, 550, 570, 600, and 650 nm. As is apparent lot of data is missing between any two data points. Thus, in step 910, an interpolated spectral power distribution of the light source 701 is determined from the normalized sensor readings of each channel to construct data points within the known sensor readings 1001-1006 to get a full spectrum of the light source 701. According to an embodiment, the normalized sensor readings are normalized using a natural cubic spline interpolation. While linear, Lagrange, or Newton polynomial interpolation may also be used, they produce less accurate results since they would cut off some of the energy present in natural light. FIG. 11 illustrates an exemplary interpolated spectral power distribution 1100 of the six channel sensor readings 1001-1006 shown in FIG. 10. This steps allows the sensor readings to closely match a higher channel count data sample with smoother and rounded curves and with the gaps between data points substantially accurately filled in. The result of this computation yields four coefficients in four equations based on a polynomial degree value equal to 3, as follows:

$n; x0, x1, \ldots, xn, a0=f(x0), a1=f(x1), \ldots, an=f(xn)$ INPUT $aj, bj, cj, dj$ for $j=0, 1, \ldots, n-1$ OUTPUT $S(x)=Sj(x)=aj+bj(x-xj)+cj(x-xj)2+dj(x-xj)3$ for $xj \leq x \leq xj+1$. Final Equation:

With this information, the six point spectrum power distribution (y-axis) is increased to a much larger data set by solving for y (spectral power) from a chosen set of input wavelengths (x-axis).

In step 912, the interpolated spectral power distribution values may be converted to test light color values that quantify the color of light, such as tristimulus values using the CIE standard observer color matching functions. The CIE standard observer color matching functions provide a mathematical relationship between the power distribution wavelengths in electromagnetic visible spectrum and an objective description of the three physiologically perceived colors in human color vision. The XYZ standard observer uses the red primary, green primary, and the blue primary, expressed as X, Y, and Z, respectively, which are called the XYZ tristimulus values. These tristimulus values can be used to represent any color and are conceptualized as amounts of three primary colors in a tri-chromatic, additive color model. FIG. 12 illustrates the CIE XYZ standard observer color matching functions that lead to the XYZ tristimulus values. Other observers, such as the CIE RGB space, or other RGB color spaces, are defined by other sets of three color-matching function that lead to tristimulus values in those other spaces. This allows the sensor readings to be translated into data that can be used to illuminate light via light fixtures 106. These XYZ values can also be used to obtain other units of measure, such as the CCT or RGB color representation.

In step 914, the test fixture 700 receives the target light color values from the spectrometer 710. Then, in step 916, a calibration matrix is determined by correlating or mapping the test light color values taken from the sensor unit 101 to target light color values taken from the spectrometer 710. Since the spectrometer 710 produces more accurate and realistic readings, the calibration matrix allows the readings from the sensor unit 101 to more closely represent the sensed light with only a small number of channels (such as six channels). This allows the production of a low cost sensor unit 101 with high resolution.

The calibration matrix is essentially a transformation matrix of the true color sampled values (i.e., the test light color values from the sensor) and the absolute color values (i.e., the target light color values using the calibrated reference spectrometer). Therefore, the calibration matrix creates a relationship between both measurements. The values for the test light color values and the target light color values may be in the XYZ color space. The calibration matrix can comprise a square 3×3 size matrix. The calibration matrix can be computed using the following formula:

$$K = (T \cdot S^T) \cdot (S \cdot S^T)^{-1}$$

where,

S is the matrix of the test light color values;
T is the matrix of the target light color values; and
K is the final calibration matrix.

The matrix of the test light color values (S) and the matrix of the target light color values (S) can comprise the following matrixes:

$$T = \begin{pmatrix} X_1 & & X_n \\ Y_1 & \cdots & Y_n \\ Z_1 & & Z_n \end{pmatrix}$$

$$S = \begin{pmatrix} X_1 & & X_n \\ Y_1 & \cdots & Y_n \\ Z_1 & & Z_n \end{pmatrix}$$

Each column in each matrix is one sample starting with 1 to n. The three rows in each matrix are the components of the color, in this case XYZ.

According to an embodiment, the light color sensor 101 may be calibrated for a convergence period to take a plurality of samples of the sensor readings in step 906 for robustness in determining the calibration matrix. To build a comprehensive calibration matrix that properly captures the color of natural sunlight, the test light color values and the target light color values should be obtained by capturing a plurality of samples under different ambient lighting conditions, including, but not limited to, during different times of day (i.e., during sunrise, midday, and sunset), during different times of year (i.e., summer versus winter), on a sunny day with clear sky under direct sunlight, on a sunny day with clear sky but indirectly in the shade, during a cloudy day, or the like. Using these plurality of samples, the calibration is built overtime. The plurality of the sensor reading samples for each sensor channel may be captured as calibration data in a buffer of memory 705 of the test fixture 700. Additionally, faulty sensor reading samples that significantly differ from the other sensor reading samples may be discarded. The buffered sensor reading samples may be averaged and the averaged sensor readings may be used to determine the calibration matrix. In addition, the final calibration matrix can be compiled from a plurality of matrixes each fine-tuned to particular lighting conditions to increase accuracy.

In step 918, the determined calibration matrix is stored by the sensor unit 101 in memory 205. As discussed above, a single calibration matrix can be used for all produced sensor units 101 since their data was normalized to account for the aforementioned manufacturing deficiencies.

According to yet another embodiment, for a different application, instead of calibrating the light color sensor to ambient light, the calibration matrix may be obtained by calibrating the light color sensor 101 to a different light source it is meant to measure. For example, if the light color sensor 101 is meant to detect the light color of a particular LED light source, it can be calibrated to that LED light source according to FIG. 9.

FIG. 13 represents a method executed by the light color sensor 101 to measure a color of light, or more particularly its color temperature, when the light color sensor 101 is installed in the field. In step 1301, the light color sensor 101 may receive a command to measure a light source. For example, as previously discussed, the light color sensor 101 may be installed outdoors to detect the color temperature of sunlight. In step 1302, the light color sensor 101 receives sensor readings from each channel of the light color sensing module 202. These sensor readings may be raw sensor readings or they may comprise calibrated module sensor readings by multiplying the raw sensor readings by the module gain value for each sensor channel determined in step 501 of FIG. 5 discussed above. Additionally, the sensor 101 may be configured to capture a plurality of sensor readings in step 1302 per each sensor channel. The sensor readings may be stored in an array and the sensor 101 may keep a running average of the samples. The averaged sensor readings for each sensor channel may be then used to determine the final sensor output.

In step 1304, the sensor 101 normalizes the sensor readings by multiplying the sensor reading of each sensor channel by the stored normalizing gain values for the respective sensor channel to yield normalized sensor readings. In step 1306, the sensor determines an interpolated spectral power distribution of the light source from the normalized sensor reading of each channel using a natural cubic spline interpolation in a similar manner as discussed above. In step 1308, the sensor 110 converts the interpolated spectral power distribution of the light source to measured light color values that quantify the color of light, such as the XYZ tristimulus values. In step 1310, the sensor 101 correlates the measured light color values through the calibration matrix to obtain calibrated light color values.

According to one embodiment, if it is desired to measure the actual color hue or tint of natural light or of an artificial light, the sensor 101 can output the calibrated light color values, such as XYZ tristimulus values. In another embodiment, the calibrated light color values can be outputted as another units of measure that quantify the color of light, such as x,y, RGB, HSV, or similar color values. These calibrated light color values can be directly or indirectly used to modify the light source 106.

On the other hand, according to another embodiment, if the sensor 101 is desired and set to measure the color temperature of light, in step 1312, the sensor 101 can convert the calibrated light color values to a color temperature value such as a correlated color temperature (CCT) value. Correlated color temperature is used to represent the chromaticity of a white light sources. It is defined by the proximity of the light source's chromaticity coordinates to a blackbody locus, such as the Planckian curve, which defines the colors of white light. FIG. 14 shows an x, y chromaticity space 1400 with the Planckian locus 1401, representing color temperatures of an ideal black-body radiator in a range from red to orange to yellow to white to blueish white, each conventionally expressed in kelvin units. Correlated color temperatures at lower color temperature levels (between about 2000K-3500K) are called "warm colors" or "warm white"

with yellowish white through orange or reddish appearance. Color temperatures at middle color temperature levels (between about 4000K-5000K) are called "neutral" or "bright white" with more natural white light appearance. On the upper end (above 5500 K), color temperatures are referred as "daylight" with a bluish white appearance.

The calibrated light color values, such as the XYZ tristimulus values, which may not be equal to the white colors on the Planckian curve 1401, are correlated to the closest value that falls on the Planckian curve, which defines the correlated color temperature. For example, the sensor 101 can apply the calibrated XYZ tristimulus values to a mathematical method to obtain the CCT value, such as using Robertson's method or that of McCamy's cubic approximation formula as follows:

$$CCT(x,y)=-449n^3+3525n^2-6823.3n+5520.33$$

Finally, in step 1314, the light color sensor 101 may output the color temperature value. As discussed above, the color temperature value can be used to control an artificial light source 106, for example to match interior light to exterior lighting conditions.

INDUSTRIAL APPLICABILITY

The disclosed embodiments provide a system, software, and a method for a light color sensor. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

What is claimed is:

1. An ambient light color sensing device adapted to determine color of ambient light comprising:
   a light color sensor comprising a plurality of channels that detect light at different wavelengths to produce sensor readings;
   a memory comprising a calibration matrix; and
   at least one processor, wherein the at least one processor:
   receives sensor readings from the light color sensor;
   determines an interpolated spectral power distribution from the received sensor readings;
   converts the interpolated spectral power distribution to at least one measured light color value that quantifies color of light; and
   determines at least one calibrated light color value by correlating the at least one measured light color value through the calibration matrix.

2. The device of claim 1, wherein the calibration matrix is determined by calibrating a test light color sensing device under at least one ambient lighting condition.

3. The device of claim 2, wherein the calibration matrix correlates test sensor readings determined by the test light color sensing device under the at least one ambient lighting condition with target sensor readings determined by a spectrometer under the at least one ambient lighting condition.

4. The device of claim 2, wherein the calibration matrix is determined by testing the test light color sensing device under different ambient lighting conditions.

5. The device of claim 4, wherein the different ambient lighting conditions are selected from the group consisting of different times of day, different times of year, on a sunny day with clear sky under direct sunlight, on a sunny day with clear sky but indirectly in the shade, during a cloudy day, and any combinations thereof.

6. The device of claim 2, wherein the test light color sensing device comprises substantially the same components as the ambient light color sensing device, or the ambient light color sensing device is the test light color sensing device.

7. The device of claim 2, wherein the calibration matrix is determined by a test processor, wherein the test processor:
   receives test sensor readings from a light color sensor of the test light color sensing device under the at least one ambient lighting condition;
   determines a test interpolated spectral power distribution from the received test sensor readings;
   converts the test interpolated spectral power distribution to at least one test light color value that quantifies color of light; and
   determines the calibration matrix by correlating the at least one test light color value to at least one target light color value, wherein the at least one target light color value is determined from target sensor readings received from a spectrometer under the at least one ambient lighting condition.

8. The device of claim 7, wherein the test light color sensing device comprises at least one processor adapted to store a test normalized gain value for each channel of the light color sensor of the test light color sensing device and normalize each received test sensor reading using the test normalized gain value of a respective channel of the light color sensor of the test light color sensing device, wherein each test normalized gain value is determined by calibrating the test light color sensing device to an artificial light source.

9. The device of claim 2, wherein the sensor readings of the ambient light color sensing device and test sensor readings of the test light color sensing device during calibration thereof are normalized by calibrating the ambient light color sensing device and the test light color sensing device to an artificial light source.

10. The device of claim 1, wherein the memory further comprises a normalized gain value for each channel, wherein the at least one processor further normalizes each received sensor reading using the normalized gain value of a respective channel.

11. The device of claim 10, wherein each normalized gain value is determined by calibrating the ambient light color sensing device to an artificial light source.

12. The device of claim 11, wherein the normalized gain values are determined by a test processor, wherein the test processor:
stores a target representation of a spectral power distribution of the artificial light source;
receives test sensor readings of the artificial light source from the light color sensor;
determines a test representation of spectral power distribution of the artificial light source using the test sensor readings; and
determines the normalizing gaining values by comparing the test representation of spectral power distribution of the artificial light source to the target representation of the spectral distribution of the artificial light source.

13. The device of claim 12, wherein the target representation of the spectral power distribution of the artificial light source is determined from sensor readings of the artificial light source by a spectrometer.

14. The device of claim 12, wherein the artificial light source comprises a substantially linear spectral power distribution.

15. The device of claim 14, wherein the test representation of spectral power distribution of the artificial light source comprises a test slope, and wherein the target representation of the spectral distribution of the artificial light source comprises a target slope.

16. The device of claim 1 further comprising a sensor body having at least one diffuser, wherein the light color sensor is disposed below the at least one diffuser and detects the light collected by the at least one diffuser.

17. The device of claim 16, wherein the received sensor readings comprise calibrated sensor readings obtained by multiplying raw sensor readings from each channel of the light color sensor by a module gain value for the respective channel, wherein the module gain value for each channel is determined by calibrating the light color sensor to an artificial light source outside of the sensor body.

18. The device of claim 1, wherein the interpolated spectral power distribution is determined by using a natural cubic spline interpolation.

19. A method of calibrating an ambient light color sensing device to determine color of ambient light, wherein the ambient light color sensing device comprises a light color sensor comprising a plurality of channels that detect light at different wavelengths to produce sensor readings, wherein the method comprises the steps of:
storing a calibration matrix at the ambient light color sensing device;
receiving sensor readings from the light color sensor;
determining an interpolated spectral power distribution from the received sensor readings;
converting the interpolated spectral power distribution to at least one measured light color value that quantifies color of light; and
determining at least one calibrated light color value by correlating the at least one measured light color value through the calibration matrix.

20. The method of claim 19 further comprising the steps of:
determining the calibration matrix by calibrating a test light color sensing device under at least one ambient lighting condition.

21. The method of claim 20, wherein the step of determining the calibration matrix comprises the steps of:
receiving test sensor readings from a light color sensor of the test light color sensing device under the at least one ambient lighting condition;
determining a test interpolated spectral power distribution from the received test sensor readings;
converting the test interpolated spectral power distribution to at least one test light color value that quantifies color of light; and
determined at least one target light color value from target sensor readings received from a spectrometer under the at least one ambient lighting condition; and
determining the calibration matrix by correlating the at least one test light color value to the at least one target light color value.

22. The method of claim 20 further comprises the step of:
normalizing the sensor readings of the ambient light color sensing device and test sensor readings of the test light color sensing device during calibration thereof by calibrating the ambient light color sensing device and the test light color sensing device to an artificial light source.

23. The method of claim 19 further comprises the steps of:
determining a normalized gain value for each channel of the light color sensor by calibrating the ambient light color sensing device to an artificial light source; and
normalizing each received sensor reading of the light color sensor using the normalized gain value of a respective channel.

24. The method of claim 23, wherein the step of determining the normalized gain values further comprises the steps of:
storing a target representation of a spectral power distribution of the artificial light source;
receiving test sensor readings of the artificial light source from the light color sensor;
determining a test representation of spectral power distribution of the artificial light source using the test sensor readings; and
determining the normalizing gaining values by comparing the test representation of spectral power distribution of the artificial light source to the target representation of the spectral distribution of the artificial light source.

\* \* \* \* \*